(12) United States Patent
Pugh et al.

(10) Patent No.: US 9,621,446 B2
(45) Date of Patent: Apr. 11, 2017

(54) COMBINING MEASUREMENTS BASED ON BEACON DATA

(71) Applicant: comScore, Inc., Reston, VA (US)

(72) Inventors: Brian Pugh, Reston, VA (US); Hilary Spring, Reston, VA (US); Balakrishnan Vinayak Nair, Herndon, VA (US)

(73) Assignee: comScore, Inc., Reston, VA (US)

( * ) Notice: Subject to any disclaimer, the term of this patent is extended or adjusted under 35 U.S.C. 154(b) by 276 days.

(21) Appl. No.: 13/799,874

(22) Filed: Mar. 13, 2013

(65) Prior Publication Data
US 2014/0122703 A1    May 1, 2014

Related U.S. Application Data

(60) Provisional application No. 61/719,128, filed on Oct. 26, 2012.

(51) Int. Cl.
H04L 12/26 (2006.01)
H04L 29/08 (2006.01)
G06F 15/173 (2006.01)
H04N 21/258 (2011.01)

(52) U.S. Cl.
CPC .......... *H04L 43/0876* (2013.01); *H04L 67/02* (2013.01); *H04L 67/22* (2013.01); *H04L 67/306* (2013.01); *H04N 21/25891* (2013.01)

(58) Field of Classification Search
CPC ....... H04N 21/25891; H04N 21/42684; G06Q 30/0205; H04L 43/0876; H04L 67/02; H04L 67/22

USPC ................... 709/223–224; 705/7.34
See application file for complete search history.

(56) References Cited

U.S. PATENT DOCUMENTS

| 2006/0156392 | A1 | 7/2006 | Baugher |
| 2008/0249905 | A1* | 10/2008 | Wong ............... G06Q 30/02 705/34 |
| 2009/0132559 | A1* | 5/2009 | Chamberlain et al. ....... 707/100 |
| 2009/0182597 | A1* | 7/2009 | Bull et al. .................. 705/7 |
| 2010/0131969 | A1 | 5/2010 | Tidwell |
| 2010/0228850 | A1 | 9/2010 | Fomitchev |
| 2011/0185016 | A1 | 7/2011 | Kandasamy |
| 2011/0289190 | A1 | 11/2011 | Chamberlain |
| 2012/0079519 | A1 | 3/2012 | Fu |

(Continued)

OTHER PUBLICATIONS

Melanie Pinola, How Can I Find Out If Someone's Stealing My Wi-Fi?, Jan. 21, 2011, www.lifehacker.com.au, http://www.lifehacker.com.au/2011/01/how-can-i-find-out-if-someone%E2%80%99s-stealing-my-wi-fi/.*

(Continued)

*Primary Examiner* — Emmanuel L. Moise
*Assistant Examiner* — Zi Ye
(74) *Attorney, Agent, or Firm* — Fish & Richardson P.C.

(57) ABSTRACT

Usage data representing resource accesses on a network by client devices in a plurality of households is accessed. Based on the accessed usage data, a set of the households that the usage data indicates are associated with a specified number and type of client devices is determined. A subset of the usage data is extracted, where the subset corresponds to resource accesses by client devices associated with the subset of households. Usage information is determined for the specified number and type of client devices based on the extracted subset of the usage data.

22 Claims, 23 Drawing Sheets

(56) References Cited

U.S. PATENT DOCUMENTS

| | | |
|---|---|---|
| 2012/0084828 A1 | 4/2012 | Rowe |
| 2012/0131685 A1* | 5/2012 | Broch |
| 2012/0166379 A1* | 6/2012 | Dasgupta et al. ............... 706/50 |
| 2012/0185299 A1* | 7/2012 | Kobayashi et al. .......... 705/7.34 |
| 2013/0007236 A1* | 1/2013 | Besehanic ..................... 709/223 |

OTHER PUBLICATIONS

Notification of Transmittal of the International Search Report and the Written Opinion of the International Searching Authority, or the Declaration issued in PCT/US2013/066584 on May 2, 2014, 8 pages.

\* cited by examiner

COMBINING MEASUREMENTS BASED ON BEACON DATA

CROSS-REFERENCE TO RELATED APPLICATIONS

This application claims the benefit under 35 U.S.C. §119 (e)(1) of prior U.S. Provisional Application No. 61/719,128, filed Oct. 26, 2012, which is incorporated by reference in its entirety.

BACKGROUND

Internet audience measurement may be useful for a number of reasons. For example, some organizations may want to be able to make claims about the size and growth of their audiences or technologies. Similarly, understanding consumer behavior, such as how consumers interact with a particular web site or group of web sites, may help organizations make decisions that improve their traffic flow or the objective of their site. In addition, understanding Internet audience visitation and habits may be useful in supporting advertising planning, buying, and selling.

SUMMARY

In one aspect, usage data representing resource accesses on a network by client devices in a plurality of households is accessed. Based on the accessed usage data, a set of the households that the usage data indicates are associated with a specified number and type of client devices is determined. A subset of the usage data is extracted, the subset corresponding to resource accesses by client devices associated with the subset of households. Usage information for the specified number and type of client devices is determined based on the extracted subset of the usage data.

Implementations may include one or more of the following features. For example, the specified number and type of client devices is exactly one client device of a first client device type and exactly one client device of a second client device type. The first client device type is a personal computer type and the second client device type is a mobile device type. Determining usage information includes determining a measure of overlap between the first client device type and the second client device type. Determining usage information includes determining a measure of overlap between the specified number and type of client devices based on the extracted subset of the usage data. Determining, based on the accessed usage data, the set of the households that the usage data indicates are associated with a specified number and type of client devices includes: determining a base set of beacon cookies that correspond to resource accesses by devices of a particular type; determining a base set of usage data including data indicating resource accesses associated with the determined base set of beacon cookies; and determining, based on the base set of usage data, a set of reference beacon cookies that are persistent for at least a majority of a first time period and are associated with resource accesses from a single network address during the first time period. Determining the base set of beacon cookies includes determining a base set of beacon cookies for which each of the beacon cookies in the set is associated with one or more resource accesses by a personal computer located in a particular geographic region within the defined period of time.

Implementations may also include one or more of the following features. For example, determining the set of households includes: determining a set of reference network addresses by selecting one or more network addresses associated with the set of reference beacon cookies; and determining a set of candidate network address by selecting, from the reference network addresses, network addresses for which all associated cookies are persistent during a majority of the first time period. Determining, based on the accessed usage data, the set of the households that the usage data indicates are associated with a specified number and type of client devices includes selecting network addresses, from among the set of candidate network addresses, that the usage data indicates are associated with exactly one personal computer and exactly one mobile device during the first time period. Determining the set of households includes: determining, for each of the candidate network addresses, a number of client devices of a first type that are associated with the candidate network address; and determining, for each of the candidate network addresses, a number of client devices of a second type that are associated with the candidate network address.

Implementations may also include one or more of the following features. For example, the first type is personal computers and determining the number of client devices of the first type that are associated with the candidate network address includes: determining a portion of the usage data that represents resource accesses associated with the candidate network address; determining a number of operating systems for devices of the first type that are indicated by the portion of the usage data; determining, for each of one or more user agent types for devices of the first type, a number of different cookies associated with the user agent type in the determined portion of the usage data; and estimating a number of personal computers associated with the candidate network address based on the number of operating systems and the numbers of different cookies associated with the respective one or more user agent types. The first type is mobile devices and determining the number of client devices of the first type that are associated with the candidate network address includes: determining a portion of the usage data that represents resource accesses associated with the candidate network address; determining a number of user agents for devices of the first type that are indicated by the portion of the usage data; determining, for each of one or more mobile application publishers, a number of different identifier values associated with the mobile application publisher in the portion of the usage data; and estimating a number of mobile devices associated with the network address based on the number of user agents and the numbers of different identifier values associated with the respective mobile application publishers. Extracting the subset of the usage data includes, for each of one or more households in the set of households: extracting, from the usage data, in-home data for the household indicating resource accesses associated with a home network address corresponding to the household; determining a set of household cookies that are associated with the in-home data; and extracting, from the usage data, out-of-home data for the household indicating resource accesses that are (i) associated with one of the household cookies and (ii) associated with a network address different from the home network address.

In one aspect, usage data representing resource accesses on a network by client devices in a plurality of households is accessed. A set of the households is determined for which the usage data indicates resource accesses by client devices in the household during a specified time period are performed by only one client device of a first device type and only one client device of a second device type. A subset of the usage data is extracted, the subset indicating resource accesses of the client device of the first type and the client device of the second type for each of the households in the set. A measure of overlap between client devices of the first type and client devices of the second type is determined based on the extracted subset of the usage data.

In one aspect, usage data representing resource accesses on a network is accessed. A set of identifiers in the usage data that satisfy one or more criteria is determined. A set of households is determined based on the set of identifiers. From among the set of households, a subset of households estimated to be associated with a specified number and type of client devices is determined. A subset of the usage data corresponding to the households in the subset is extracted. Data representing usage overlap of multiple types of client devices is determined based on the extracted subset of the usage data.

Implementations of any of the described techniques may include a method or process, an apparatus, a device, a machine, a system, or instructions stored on a computer-readable storage device. The details of particular implementations are set forth in the accompanying drawings and description below. Other features will be apparent from the following description, including the drawings, and the claims.

DETAILED DESCRIPTION

In general, webpage or other resource accesses by client systems may be recorded, and those accesses may be analyzed to develop audience measurement reports. Data about resource accesses can be collected using a beacon-based approach. A beacon-based approach generally involves associating script or other code with the resource being accessed such that the code is executed when a client system renders or otherwise employs the resource. When executed, the beacon code sends a message from the client system to a collection server. The message includes certain information, such as an identifier of the resource accessed.

The beacon code may be accessed and processed by a number of different types of client systems, such as personal computers, mobile devices, and shared use devices (for example, computers at libraries or internet cafés). However, each type of device may present somewhat different challenges when translating the measured activity from a machine-basis to a person-basis. For instance, a beacon-based approach may employ cookies or IP addresses to help uniquely identify the activity of a particular machine. However, there may be difficulties in translating such activity to unique persons because cookies may be deleted or IP addresses may be dynamically assigned. Such issues are more or less prevalent depending on the type of device. Accordingly, the following describes various techniques for accounting for these types of difficulties on various types of client systems when determining audience measurements such as unique views or reach.

Furthermore, a given user may use more than one type of device. Yet for certain types of audience measurements, such as unique views or reach, that person should be counted once, rather than multiple times. Because he or she is using a different device, however, it may be difficult to understand that the same person is using both types of devices. Accordingly, the following describes various techniques for accounting for such overlap when combining audience measurements across different device types.

Figure 1:
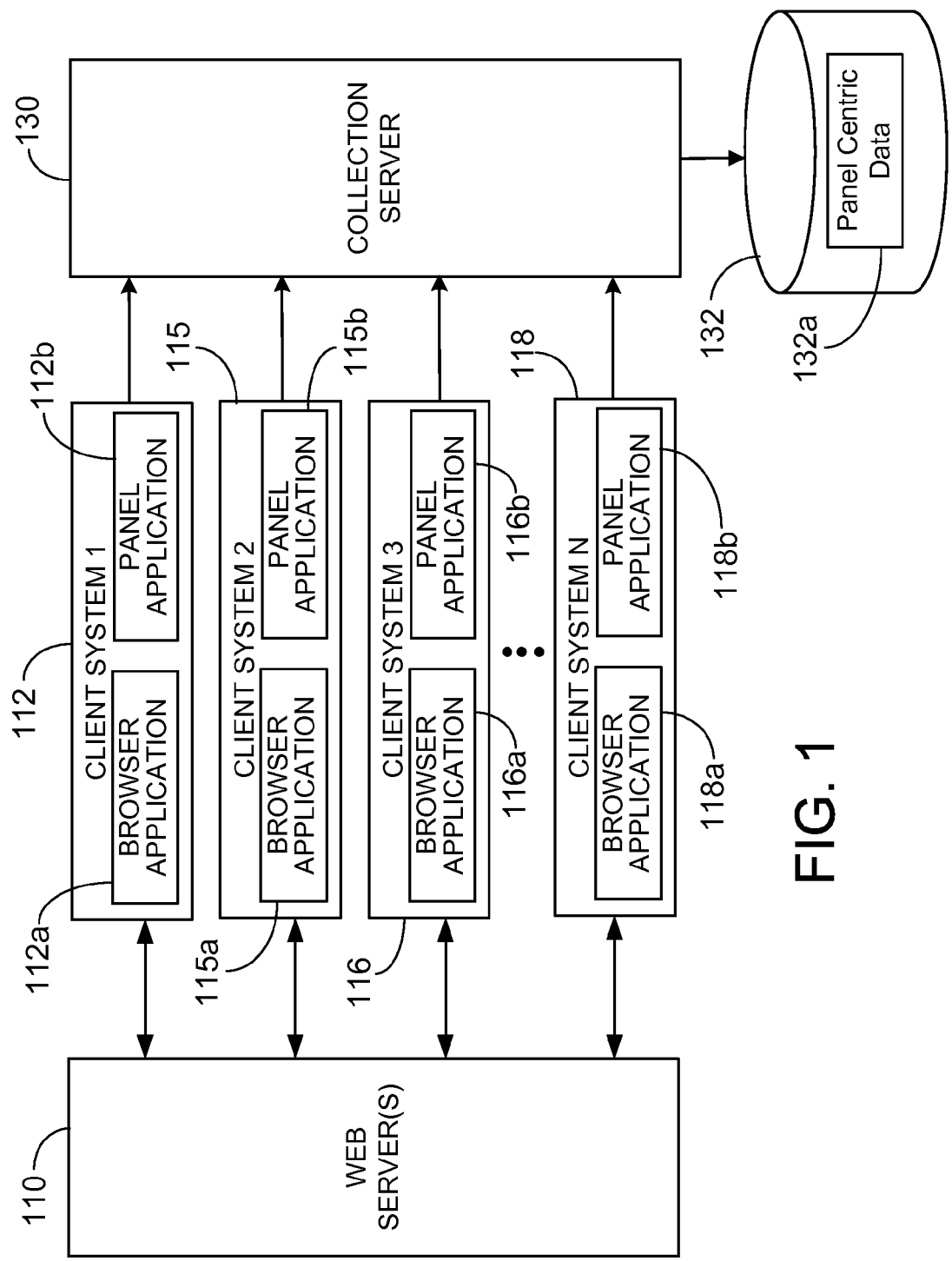
FIG. 1 illustrates an example of a system in which a panel of users may be used to perform Internet audience measurement.

FIG. 1 illustrates an example of a system 100 in which a panel of users may be used to collect data for Internet audience measurement. As described in more detail below, data from the panel of users may be used to correct or adjust beacon-based data for personal computers (e.g., non-mobile, non-shared use devices).

The system 100 includes client systems 112, 114, 116, and 118, one or more web servers 110, a collection server 130, and a database 132. In general, the users in the panel employ client systems 112, 114, 116, and 118 to access resources on the Internet, such as webpages located at the web servers 110. Information about this resource access is sent by each client system 112, 114, 116, and 118 to a collection server 130. This information may be used to understand the usage habits of the users of the Internet.

Each of the client systems 112, 114, 116, and 118, the collection server 130, and the web servers 110 may be implemented using, for example, a general-purpose computer capable of responding to and executing instructions in a defined manner, a personal computer, a special-purpose computer, a workstation, a server, or a mobile device. Client systems 112, 114, 116, and 118, collection server 130, and web servers 110 may receive instructions from, for example, a software application, a program, a piece of code, a device, a computer, a computer system, or a combination thereof, which independently or collectively direct operations. The instructions may be embodied permanently or temporarily in any type of machine, component, equipment, or other physical storage medium that is capable of being used by a client system 112, 114, 116, and 118, collection server 130, and web servers 110.

In the example shown in FIG. 1, the system 100 includes client systems 112, 114, 116, and 118. However, in other implementations, there may be more or fewer client systems. Similarly, in the example shown in FIG. 1, there is a single collection server 130. However, in other implementations there may be more than one collection server 130. For example, each of the client systems 112, 114, 116, and 118 may send data to more than one collection server for redundancy. In other implementations, the client systems 112, 114, 116, and 118 may send data to different collection servers. In this implementation, the data, which represents data from the entire panel, may be communicated to and aggregated at a central location for later processing. The central location may be one of the collection servers.

The users of the client systems 112, 114, 116, and 118 are a group of users that are a representative sample of the larger universe being measured, such as the universe of all Internet users or all Internet users in a geographic region. To understand the overall behavior of the universe being measured, the behavior from this sample is projected to the universe being measured. The size of the universe being measured and/or the demographic composition of that universe may be obtained, for example, using independent measurements or studies. For example, enumeration studies may be conducted monthly (or at other intervals) using random digit dialing.

Similarly, the client systems 112, 114, 116, and 118 are a group of client systems that are a representative sample of the larger universe of client systems being used to access resources on the Internet. As a result, the behavior on a machine basis, rather than person basis, can also be, additionally or alternatively, projected to the universe of all client systems accessing resources on the Internet. The total universe of such client systems may also be determined, for example, using independent measurements or studies The users in the panel may be recruited by an entity controlling the collection server 130, and the entity may collect various demographic information regarding the users in the panel, such as age, sex, household size, household composition, geographic region, number of client systems, and household income. The techniques used to recruit users may be chosen or developed to help insure that a good random sample of the universe being measured is obtained, biases in the sample are minimized, and the highest manageable cooperation rates are achieved. Once a user is recruited, a monitoring application is installed on the user's client system. The monitoring application collects the information about the user's use of the client system to access resources on the Internet and sends that information to the collection server 130.

For example, the monitoring application may have access to the network stack of the client system on which the monitoring application is installed. The monitoring application may monitor network traffic to analyze and collect information regarding requests for resources sent from the client system and subsequent responses. For instance, the monitoring application may analyze and collect information regarding HTTP requests and subsequent HTTP responses.

Thus, in system 100, a monitoring application 112b, 114b, 116b, and 118b, also referred to as a panel application, is installed on each of the client systems 112, 114, 116, and 118. Accordingly, when a user of one of the client systems 112, 114, 116, or 118 employs, for example, a browser application 112a, 114a, 116a, or 118a to visit and view web pages, information about these visits may be collected and sent to the collection server 130 by the monitoring application 112b, 114b, 116b, and 118b. For instance, the monitoring application may collect and send to the collection server 130 the URLs of web pages or other resources accessed, the times those pages or resources were accessed, and an identifier associated with the particular client system on which the monitoring application is installed (which may be associated with the demographic information collected regarding the user or users of that client system). For example, a unique identifier may be generated and associated with the particular copy of the monitoring application installed on the client system. The monitoring application also may collect and send information about the requests for resources and subsequent responses. For example, the monitoring application may collect the cookies sent in requests and/or received in the responses. The collection server 130 receives and records this information. The collection server 130 aggregates the recorded information from the client systems and stores this aggregated information in the database 132 as panel-centric data 132a.

The panel-centric data 132a may be analyzed to determine the visitation or other habits of users in the panel, which may be extrapolated to the larger population of all Internet users. The information collected during a particular usage period (session) can be associated with a particular user of the client system (and/or his or her demographics) that is believed or known to be using the client system during that time period. For example, the monitoring application may require the user to identify his or herself, or techniques such as those described in U.S. Patent Application No. 2004-0019518 or U.S. Pat. No. 7,260,837, both incorporated herein by reference, may be used. Identifying the individual using the client system may allow the usage information to be determined and extrapolated on a per person basis, rather than a per machine basis. In other words, doing so allows the measurements taken to be attributable to individuals across machines within households, rather than to the machines themselves.

To extrapolate the usage of the panel members to the larger universe being measured, some or all of the members of the panel are weighted and projected to the larger universe. In some implementations, a subset of all of the members of the panel may be weighted and projected. For instance, analysis of the received data may indicate that the data collected from some members of the panel may be unreliable. Those members may be excluded from reporting and, hence, from being weighted and projected.

The reporting sample of users (those included in the weighting and projection) are weighted to insure that the reporting sample reflects the demographic composition of the universe of users to be measured, and this weighted sample is projected to the universe of all users. This may be accomplished by determining a projection weight for each member of the reporting sample and applying that projection weight to the usage of that member. Similarly, a reporting sample of client systems may be projected to the universe of all client systems by applying client system projection weights to the usage of the client systems. The client system projection weights are generally different from the user projection weights.

The usage behavior of the weighted and projected sample (either user or client system) may then be considered a representative portrayal of the behavior of the defined universe (either user or client system, respectively). Behavioral patterns observed in the weighted, projected sample may be assumed to reflect behavioral patterns in the universe.

Estimates of visitation or other behavior can be generated from this information. For example, this data may be used to estimate the number of unique visitors (or client systems) visiting certain web pages or groups of web pages, or unique visitors within a particular demographic visiting certain web pages or groups of web pages. This data may also be used to determine other estimates, such as the frequency of usage per user (or client system), average number of pages viewed per user (or client system), and average number of minutes spent per user (or client system).

As described further below, such estimates and/or other information determined from the panel-centric data may be used with data from a beacon-based approach to generate reports about audience visitation or other activity. Using the panel-centric data with data from a beacon-based approach may improve the overall accuracy of such reports.

Figure 2:
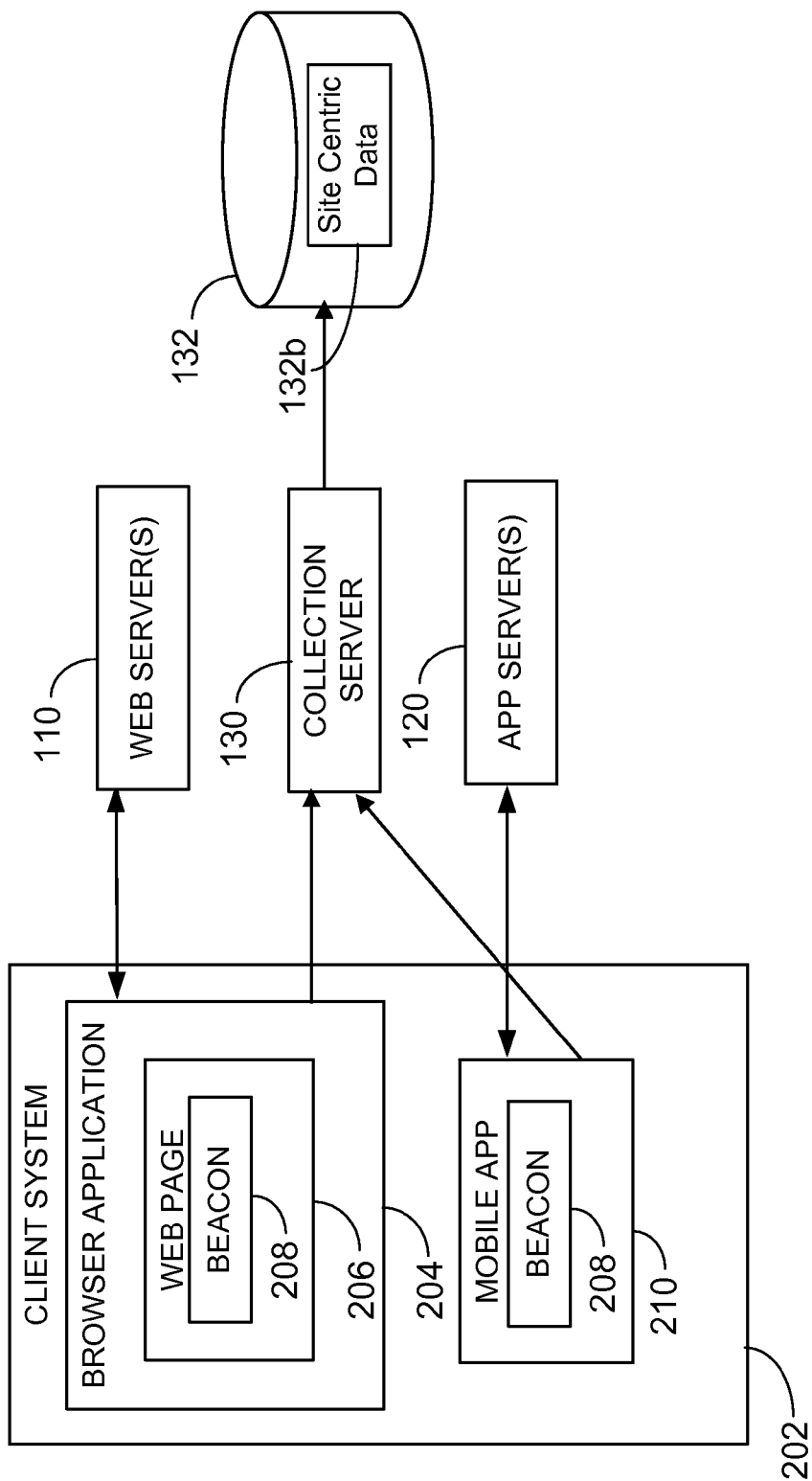
FIG. 2 illustrates an example of a system in which site-centric data can be obtained by including beacon code in one or more web pages.

Referring to FIG. 2, a beacon-based approach may be implemented using a system 200. In general, a beacon-based approach may entail including beacon code in one or more web pages.

System 200 includes one or more client systems 202, the web servers 110, the collection servers 130, and the database 132. The client systems 202 can include client systems 112, 114, 116, or 118, which have the panel application installed on them, as well as client systems that do not have the panel application installed. Client systems may include personal computing devices, mobile computing devices, shared use computing devices, or any other device with access to the Internet.

The client systems include a browser application 204 that retrieves web pages 206 from web servers 110 and renders the retrieved web pages. Some of the web pages 206 include beacon code 208. In general, publishers of web pages may agree with the entity operating the collection server 130 to include this beacon code in some or all of their web pages. This code 208 is rendered with the web page in which the code 208 is included. When rendered, the code 208 causes the browser application 204 to send a message to the collection server 130. This message includes certain information, such as the URL of the web page in which the beacon code 208 is included. For example, the beacon code may be JavaScript code that accesses the URL of the web page on which the code is included, and sends to the collection server 130 an HTTP Post message that includes the URL in a query string. Similarly, the beacon code may be JavaScript code that accesses the URL of the web page on which the code is included, and includes that in the URL in the "src" attribute of an <img> tag, which results in a request for the resource located at the URL in the "src" attribute of the <img> tag to the collection server 130. Because the URL of the webpage is included in the "src" attribute, the collection server 130 receives the URL of the webpage. The collection server 130 can then return a transparent image. The following is an example of such JavaScript:

```
<script type="text/javascript">
  document.write("<img id='img1' height='1'
  width='1'>");document.getElementById("img1").src=
  "http://example.com/scripts/report.dll?C7=" +
  escape(window.location.href) + "&rn=" +
  Math.floor(Math.random( )*99999999);
</script>
```

The collection server 130 records the webpage URL received in the message with, for instance, a time stamp of when the message was received, the IP address of the client system from which the message was received, and the user-agent information in the user-agent header. The collection server 130 aggregates this recorded information and stores this aggregated information in the database 132 as site-centric data 132b.

The message may also include a unique identifier for the client system. For example, when a client system first sends a beacon message to the collection server 130, a unique identifier may be generated for the client system (and associated with the received beacon message). That unique identifier may then be included in a beacon cookie that is set on that client system 202. As a result, later beacon messages from that client system may have the beacon cookie appended to them such that the messages include the unique identifier for the client system. If a beacon message is received from the client system without the beacon cookie (e.g., because the user deleted cookies on the client system), then the collection server 130 may again generate a unique identifier and include that identifier in a new beacon cookie set of the client system.

The client system 202 may further include a specialized application such as a mobile app 210 for accessing data associated with a network resource. In some implementations, a mobile app 210 may communicate with an app server 120 to send and receive data. The app server 120 may be a function of a general purpose web server 110 as above or may instead be a separate server dedicated only to proprietary applications such as the mobile app 210. In addition to accessing information associated with a resource, the mobile app may also include code 208 that includes beacon instructions for reporting usage data to the collection server 130. The beacon instructions provided to the mobile app 210 may be similar to the beacon instructions provided on the web page 206 to the browser application, but may include different information available to the mobile app 210, such as a unique device identifier.

The beacon messages are generally sent regardless of whether or not the given client system has the panel application installed. But, for client systems in which the panel application is installed, the panel application also records and reports the beacon message to the collection server 130. For example, if the panel application is recording HTTP traffic, and the beacon message is sent using an HTTP Post message (or as a result of an <img> tag), then the beacon message is recorded as part of the HTTP traffic recorded by the panel application, including, for instance, any cookies that are included as part of the beacon message. Thus, in this instance, the collection server 130 receives the beacon message as a result of the beacon code, and a report of the beacon message as part of the panel application recording and reporting network traffic.

Accordingly, as users of client systems 202 access webpages (e.g., on the Internet), the client systems 202 access the webpages that include the beacon code, which results in messages being sent to the collection server 130. These messages indicate the webpage that was accessed (e.g., by including the URL for the webpage), potentially a unique identifier for the client system that sent the message, and a user-agent of the client system. When a message is received at the collection server 130, a record may be generated for the received message. The record may indicate an identifier (e.g., the URL) of the webpage accessed by the client system, the unique identifier for the client system, a time at which the client system accessed the webpage (e.g., by including a time stamp of when the message was received by the collection server 130), a network address, such as an IP address, of the client system that accessed the webpage, and the user-agent, when appropriate. The collection server 130 may then aggregate these records and store the aggregated records in the database 132 as site-centric data 132b.

The site-centric data 132b includes information about the accesses by a number of different types of client systems, such as mobile client systems, shared use client systems, and non-mobile, non-shared use personal computers. The site-centric data 132b directly represents accesses by the members of the larger universe to be measured, not just the members of the panel, but because different devices are included in the data, there may be overlap between users of the different types of devices, with no ready mechanism to determine that the same user accessed a resource from, for example, both a mobile device and a personal computer. This may skew measurements of unique visitors to a given resource or group of resources and potentially inflate unique visitor estimates. Furthermore, because of the technology involved with each type of device, there may be inaccuracies when determining the unique visitors within a given type of device. The following describes various techniques for correcting such data within a given class of device, as well as when the data among device classes is combined.

Figure 3:
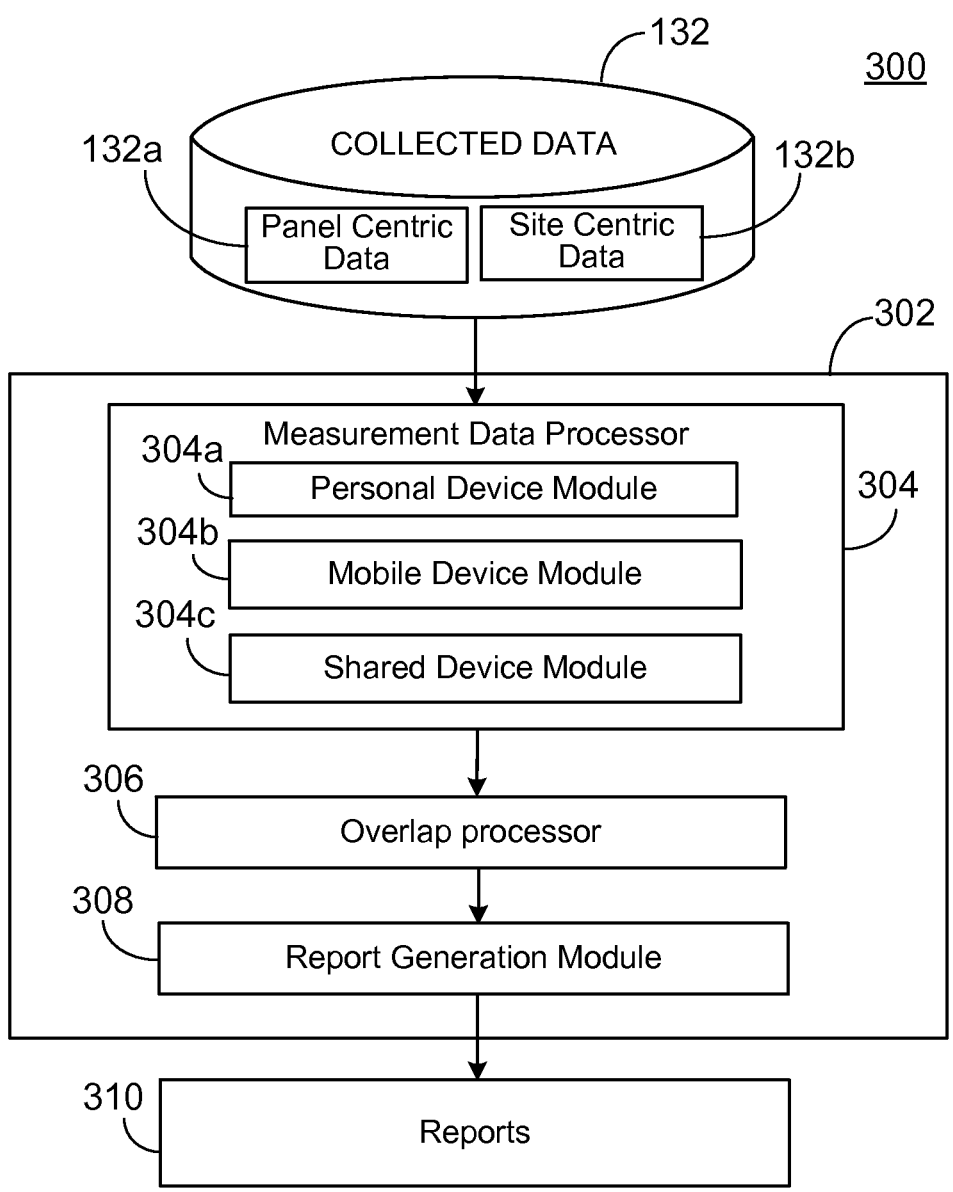
FIG. 3 illustrates an example of a system in which panel-centric data and site-centric data can be used to generate measurement data.

FIG. 3 illustrates an example of a system 300 in which panel-centric data 132a and site-centric data 132b can be used to generate measurement data. The system 300 includes a reporting server 302. The reporting server 302 may be implemented using, for example, a general-purpose computer capable of responding to and executing instructions in a defined manner, a personal computer, a special-purpose computer, a workstation, a server, or a mobile device. The reporting server 302 may receive instructions from, for example, a software application, a program, a piece of code, a device, a computer, a computer system, or a combination thereof, which independently or collectively direct operations. The instructions may be embodied permanently or temporarily in any type of machine, component, equipment, or other physical storage medium that is capable of being used by the reporting server 302.

The reporting server 302 executes instructions that implement a measurement data processor 304, an overlap processor 306, and a report generation module 308. The measurement data processor 304 includes a personal device module 304a, a mobile device module 304b, and a shared use device module 304c.

The measurement data processor 304 may access the raw panel-centric data 132a and the raw site-centric data 132b and perform one or more pre-processing functions on the accessed panel-centric data 132a and the accessed site-centric data 132b. As described above, the panel-centric data 132a indicates a first set of resources accessed by a first set of client systems (those in the panel) and the site-centric data 132b indicates a second set of resources accessed by a second set of client systems. Some of the second set of client systems are potentially in the panel and some of the second set of client systems are potentially not in the panel. Further, the second set of resources may include one or more resources that are also included in the first set of resources.

The panel-centric data 132a may include records that reflect the URLs or other identifiers of web pages or other resources accessed, the times those pages or resources were accessed, identifiers of the client systems that accessed the resources, and information about the requests and responses used to access the resources (for example, cookies sent in requests and/or received in the responses). The site-centric data 132b may include records that reflect a URL or other identifier of a resource that has been accessed by a client system, a network address of the client system that accessed the resource, a time that the client system accessed the resource (for example, as reflected by a time stamp of the time at which the beacon message was received by the collection server 130), and a unique identifier for the client system that accessed the resource (for example, included in a cookie attached to the beacon message).

The panel-centric data 132a and the site-centric data 132b that is accessed by the personal device module 304a may be the data that is aggregated for a certain, previous time period. For example, the accessed data may be the panel-centric data 132a and the site-centric data 132b aggregated over the previous 30 days.

The measurement data processor 304 may process the raw panel-centric data 132a to form state data that represents the complete fact of usage in a single record. For instance, for web page visitation, a record in the state data may indicate that a particular user, on a particular date, at a particular time, accessed web page B (as represented by the URL for that web page), using a particular client system. The measurement data processor 304 also may match some or all of the URLs in the records of the state data to patterns in a dictionary of the Internet, which may organize various different URLs into digital media properties, reflecting how Internet companies operate their businesses. Each pattern may be associated with a web entity, which may be a web page or collection of web pages that are logically grouped together in a manner that reflects how Internet companies operate their business. For example, the various web pages that are included in the finance.yahoo.com domain may be logically grouped together into a single web entity (e.g., Yahoo Finance). The dictionary may include a number of hierarchically web entities to reflect various Internet media companies and how those companies arrange their web properties. For example, the Yahoo Finance web entity may be considered a subset of the Yahoo web entity, which may cover all of the various web pages included in the yahoo.com domain. The Yahoo web entity may include other web entities, such as a Yahoo Health web entity (associated with the various web pages in the health.yahoo.com domain). The measurement data processor 304 may associate a given state record with the lowest-level web entity associated with the pattern matching the URL in the state record.

The measurement data processor 304 may also remove from the panel-centric data 132a records for users that are not to be included in the reporting sample. For example, there may be rules that are evaluated to insure that a complete record of a user's usage and non-usage during the reporting period is received. If those rules are not met, the user may be removed from the reporting sample. Also, a user may be removed if he or she does not meet certain criteria, such as being in a particular geographic area.

In addition, the personal device module 304a may remove certain types of records. For instance, records that reflect redirects or that reflect non-human initiated request (e.g., requests made as part of rendering a web page) may be removed.

The measurement data processor 304 may process the site-centric data 132b to also match some or all of the URLs in the records of the site-centric data 132b to patterns in the dictionary so as to associate the records with a web entity, such as the lowest level web entity in a hierarchy. Processing actions may then be performed on a per-web-entity basis to determine the measurement data. For example, processing may be performed for each of the lowest-level web entities, or may be performed for one or more higher level web entities, with the dictionary being used to collect the data associated with all of the lowest-level web entities included in the higher level web entity.

In addition, the measurement data processor 304 may remove certain records from the site-centric data 132b. For example, the personal device module 304a may remove records that reflect non-human initiated accesses from the site-centric data 132b. For example, a list of known search index crawlers or other robots may be used to remove records that reflect accesses from those bots. Additionally, or alternatively, if the records indicate that sequential accesses to the same or different web pages in a web entity by a particular client system occur at a defined frequency (for example, if the accesses are spaced three seconds apart or less), then accesses subsequent to the first one may be removed. This may help to remove records from non-human initiated accesses, as well as errors associated with the beacon code that may result in more than one beacon message per access.

The measurement data processor 304 may categorize the records according to device type. For instance, records for mobile devices may be detected and categorized accordingly. In some implementations, such records may be detected based on user agent or other data sent with the beacon message and recorded in the record. The measurement data processor 304 may also detect records for non-mobile, shared use client systems and categorize them accordingly. Techniques such as those described with respect to FIG. 12 may be used to detect non-mobile, shared use systems. The remaining non-categorized records may be marked as non-mobile, non-shared use systems (or other techniques may be used to detect records from such systems—for example, such systems may be detected based on the user agent data).

In addition, records may be removed for client systems not in a particular geographic area (e.g., if the reports are being generated for a particular geographic area, such as North America). The country and region of the client system corresponding to the record may be determined based on a reverse lookup of the network address (e.g., a reverse lookup of the IP address). Similarly, shared use client systems (e.g., client systems available to the public in a library) may be detected by analyzing the network access provider based on a reverse look-up of the client system's IP address (which may be captured with the beacon message).

The various modules 304a, 304b, and 304c of the measurement data processor 304 may implement various processes as describe below to generate adjusted measurement data for each category or class of device. The overlap processor 306 may implement one or more processes to combine the adjusted measurement data for the categories of devices in a manner that attempts to remove overlap of users between each category. The report generation module 308 may use the combined measurement data to generate one or more reports 310 that include information regarding client system accesses of one or more resources.

Establishing Unique Visitors on Non-Mobile, Non-Shared Use Devices

Personal computing devices are conventional devices that generally have a small set of users. Personal devices may include both work computers and computers in the user's home. Personal computers, at least at present, are the most likely type of internet device to allow the user to install panel software, and are also the most likely to keep and hold cookies over long periods of time. For this reason, in some implementations, usage data for personal computing devices is based primarily on beacon data but refined using panel data and other factors as further described herein.

Figure 4:
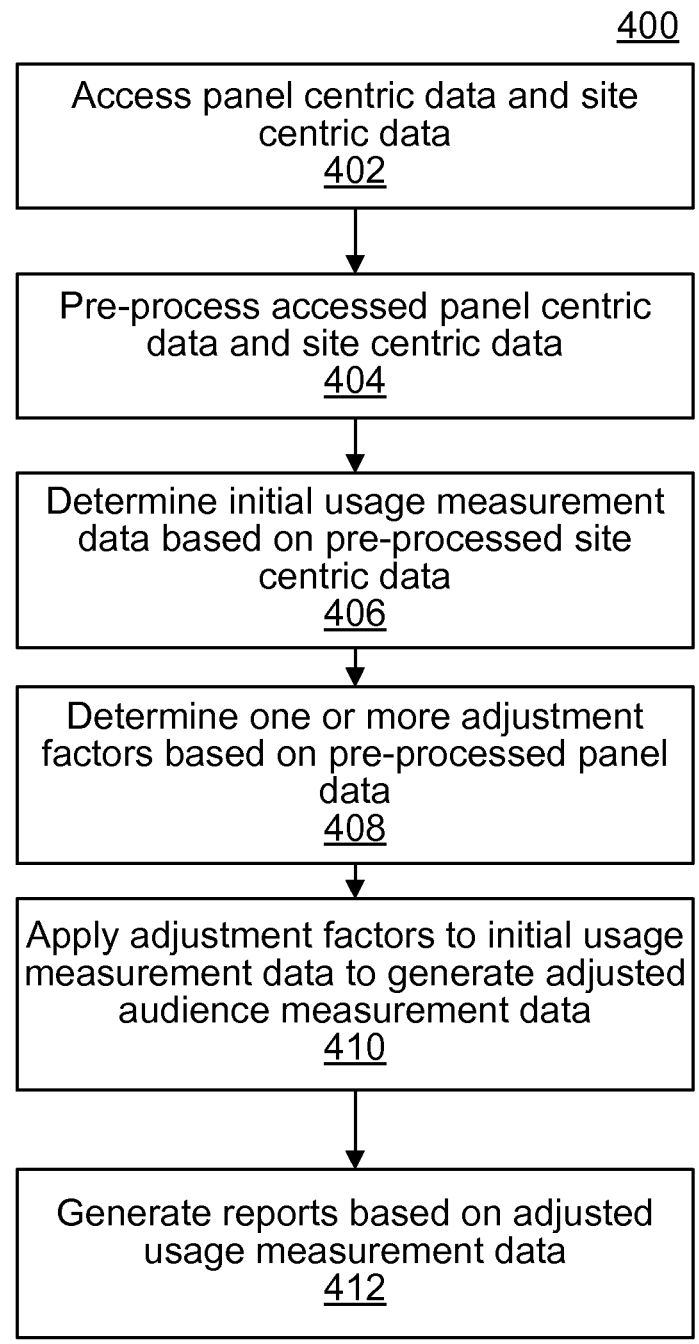
FIG. 4 is a flow chart illustrating an example of a process for determining audience measurement reports for a given web page or collection of web pages.

FIG. 4 is a flow chart illustrating an example of a process 400 for determining audience measurement reports for a given web page or collection of web pages. The following describes process 400 as being performed by the personal device module 304a. However, the process 400 may be performed by other systems or system configurations.

The personal device module 304a accesses the panel-centric data 132a and non-mobile, non-shared use site-centric data 132b (402) and perform some pre-processing of the accessed data (404). Pre-processing of both the accessed panel-centric data 132a and the accessed site-centric data 132b may involve delineating between classes of client systems. At times, it may be desirable to segment reports according to classes of non-mobile, non-shared use client systems. For example, in one implementation, the reports and underlying data, at least initially, are segmented into work vs. home client systems, with home client systems being those that are used at home while work client systems are those used at work. These two subpopulations can be identified and separated in the accessed panel-centric data 132a because users self-identified the machines as home or work (or another class) when registering. To identify and separate these two sub-populations in the accessed site-centric 132b, the beacon messages received between 8 am and 6 pm local time Monday through Friday may be assumed to be work generated traffic. All other traffic may be aligned as targets for the Home sample.

In another example for identifying and separating these two subpopulations in the accessed site-centric data 132b, a model may be developed based on observed work behavior in the panel-centric data 132a. This model may be based on time of day and day of week usage profiles. If an IP address matches the expected profile for a work machine, all traffic for that IP address may be considered work traffic. For instance, panel data may indicate that, if the number of accesses during a first time period (a work time) is greater than the number of accesses during a second time period (a home time period) by a certain amount, then a machine is probably a work machine. This information may be used, together with the site-centric data, to classify network access providers into work or home based on the whether or not accesses by users of those network access providers are greater during the work time than the home time, on average, by the certain amount. The network access provider of a given machine may then be determined based on that machine's IP address, and that machine may be classified as the same class as the network access provider.

Actions 406 to 410 then may be separately performed on the data in each subpopulation, thereby generating measurement data for the home population and measurement data for the work population. Reports then may be generated for each of these subpopulations separately, or a combined report may be generated, as further described with respect to action 412. Other implementations may similarly divide among several subpopulations.

The personal device module 304a determines initial usage measurement data based on the pre-processed site-centric data (406). For example, the personal device module 304a may determine an initial measurement of unique visitors for a given web entity. Unique visitors may represent the number of unique people that requested and/or viewed one of the web pages of the web entity. To determine the initial measurement of unique visitors, for instance, the personal device module 304a may count the number of unique cookies (that is, number of cookies with a different unique identifier) received as part of the beacon messages received for the web entity.

As another example, the personal device module 304a may determine an initial measurement of page views for a given web entity. Page views may represent the number of times the web pages for a web entity were requested and/or viewed (regardless of whether the web pages were requested or viewed by a unique person). In this case, the personal device module 304a may count the total number of beacon messages received for the web entity.

The personal device module 304a determines one or more adjustment factors based on the pre-processed panel-centric data (408). The initial audience measurement data, determined based solely on the pre-processed site-centric data, may not be accurate for a number of reasons. The pre-processed panel-centric data may be used to determine adjustment factors to correct the inaccuracies.

For example, if the initial measurement of unique visitors is based on cookies received with the beacon measurements, then there may be over or under counting of unique visitors because the cookies are set on a machine and browser basis, and not a person basis. In other words, even though multiple people may use a particular client system, only a single cookie may be set and counted for a given machine and browser. This may result in the undercounting of unique visitors.

In addition, a previously set cookie on a client system may be deleted, resulting in a new cookie and new identifier being set for further accesses during the reporting time period. As a result, accesses by the same user may be mistakenly identified as accesses from two different users, which may result in the overcounting of unique visitors. Similarly, a user may use multiple browsers, with different cookies being set for each browser. As a result, there may be multiple, different cookies for a single user because that user uses different browsers on the same machine. This may result in overcounting of unique visitors.

To account for such inaccuracies in the site-centric data 132b, a cookie-per-person adjustment factor may be determined based on the pre-processed panel-centric data. This adjustment factor may be determined on a web entity basis. This cookie-per-person adjustment factor may reflect the number of cookies that are set per person visiting beaconed web pages (that is, web pages that include the beacon code) of the web entity. As a result, this adjustment factor may be used to adjust the total count of unique visitors to compensate for multiple cookies per person or, conversely, multiple persons per cookie. This adjustment factor may be determined, for example, by using process 500 described with respect to FIG. 5.

Also, a given user may have and use multiple client systems in a given location (for example, at home). As a result, separate cookies may be set on the multiple client systems, and counted, even though only a single user is visiting the web entity. This may lead to an overcounting of unique visitors. To account for this inaccuracy, a machine overlap adjustment factor may be determined based on the pre-processed panel-centric data. This adjustment factor may be determined on a web entity basis. This machine overlap adjustment may reflect the number of client systems being used per person that visits the web entity and can, therefore, adjust the total count of unique visitors to adjust for multiple cookies per person that result from a person using more than one client system to visit the web entity. This adjustment factor may be determined, for example, by using process 600 described with respect to FIG. 6.

Furthermore, if the initial measurement of unique visitors or page views is based on receiving a beacon message from beacon code included in the web pages for the web entity, there may be undercounting of either of these measurements as a result of beacon code not being included on all of the web pages for a given web entity. This may be the result of incorrect implementation of the beacon code (for example, the beacon code is not properly placed on all web pages that are part of the web entity), or not possible for certain policy reasons. For example, one lower level web entity may choose to include beacon code on all of the web pages for that entity, while another lower level web entity may choose to not include beacon code at all. If those lower level web entities are underneath the same higher level web entity, then the beacon code can not be implemented on all of the web pages for the higher level entity since one of the lower level entities has chosen to not include beacon code. As a particular example, the MSN® website (msn.com) and the Hotmail® website (hotmail.com) may both be separate web entities under the higher level web entity designated as Microsoft®. However, these two websites may be separately operated and managed and, therefore, MSN®, for instance, may choose to beacon while Hotmail® does not. As a result, the initial audience measurement data (either page views or unique visitors) for the web entity Microsoft® does not include any counts for the Hotmail® webpages since Hotmail® does not include beacon code on the web pages for Hotmail®.

To account for inaccuracies in the page views or unique visitors that result from a failure to include beacon code in all of the web pages for a given web entity, a non-beaconed adjustment factor may be determined based on the pre-processed panel-centric data. This adjustment factor may be determined on a web entity basis. Since, ideally, the panel applications capture all web traffic, visits to non-beaconed web pages for a given entity are also captured and reported by the panel applications. Thus, the pre-processed panel-centric data may be used to determine a non-beaconed adjustment factor that reflects the number of page views or unique visits to web pages for the web entity that are not counted based on the beacon messages. This adjustment factor may be determined, for example, by using process 700 described with respect to FIG. 7.

The measurement data processor 304 applies the adjustment factors to the initial usage measurement data to generate adjusted usage measurement data (410). For instance, in one implementation for audience measurement data that reflects unique visitors for a given web entity, the measurement data processor 304 may generate adjusted unique visitors data as follows:

$$\text{Adj UVs} = ((\text{Init UVs}/\text{Cookie-Per-Person}) * \text{Machine Overlap}) + \text{Non-Beaconed}$$

where Adj UVs is the adjusted unique visitors count, Init UVs is the initial count of unique visitors based on the pre-processed site-centric data, Cookie-Per-Person is the cookie-per-person adjustment factor, Machine Overlap is the machine overlap adjustment factor, and Non-Beaconed is the non-beaconed adjustment factor. The reciprocal of the Cookie-Per-Person adjustment factor (a Person-Per-Cookie adjustment factor) may be used by multiplying this factor times the Init UVs, rather than dividing.

As another example, in one implementation for audience measurement data that reflects the total page views of web pages for a given web entity, the measurement data processor 304 may generate adjusted page views data as follows:

$$\text{Adj PageViews} = \text{Init PageViews} + \text{Non-Beaconed}$$

where Adj PageViews is the adjusted page views count, Init PageViews is the initial page views count based on the pre-processed site-centric data, and Non-Beaconed is the non-beaconed adjustment factor.

The report generation module 308 generates audience measurement reports based on the adjusted audience measurement data (412). For example, in an implementation in which the initial data is delineated between home and work client systems, the report generation module 308 may generate reports on unique visitors or page views for a given web entity for one or both of the home or work populations. Additionally, or alternatively, in such an implementation, the report generation module 308 may generate reports on unique visitors or page views for a given web entity that combine the home and work populations. In other words, the report generation module may combine the page views for the home and work populations into a combined count of page views and/or may combine the unique visitors for the home and work populations into a combined count of unique visitors.

In some implementations, when the report generation module 308 produces a combined count of unique visitors, the report generation module takes into account the number of users that are present in both the home and work populations. In some cases, a person may visit a web page for the web entity from both a home client system and a work client system. As a result, if the count of the user in the home population was simply added to the count of the user in the work population, then the user would be counted twice. The report generation module 308 may use panel-centric data 132a to determine the amount of user overlap between the two populations, and remove duplicate counts. For instance, a number of users may install the monitoring application on both work client systems and home client systems, and designate each one as such. Therefore, the data resulting from these users can be used to estimate the number of people that visit the web pages for the web entity using both home and work client systems, and this information can be used to de-duplicate those users in the combined count of unique visitors.

Figure 5:
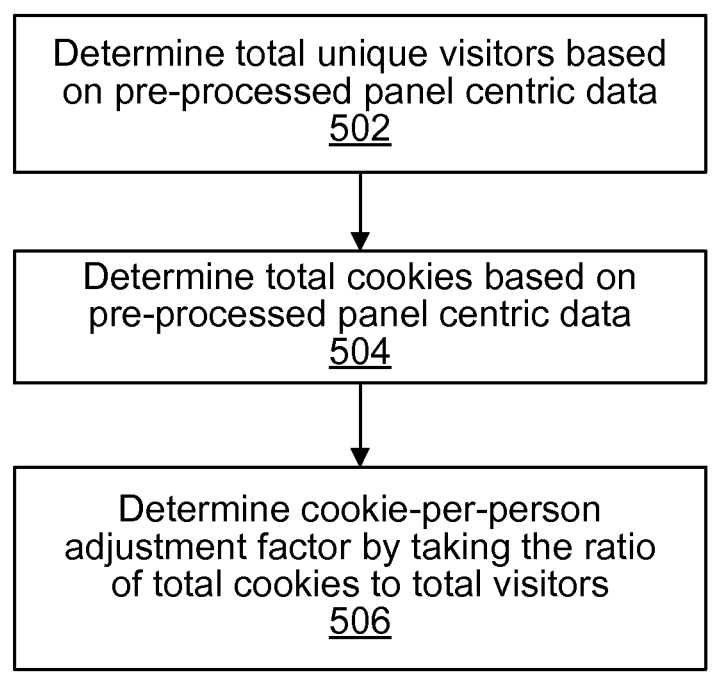
FIG. 5 is a flow chart illustrating an example of a process for determining a cookie-per-person adjustment factor.

FIG. 5 is a flow chart illustrating an example of a process 500 for determining a cookie-per-person adjustment factor. The following describes process 500 as being performed by the personal device module 304a. However, the process 500 may be performed by other systems or system configurations. As noted above, this adjustment factor may be used to adjust the initial audience measurement data for a given web entity. Thus, the following describes an implementation of process 500 in which the actions 502 to 506 are performed on a web entity basis.

The personal device module 304a determines, based on the pre-processed panel-centric data, a count of the total number of unique visitors that visited one of the beaconed web pages of a given web entity (502). For instance, the total number of unique visitors may be determined by determining which members in the pre-processed panel have an associated beacon message as a result of visiting a web page of the web entity, and adding up the projection weights for each of these members. The projection weight for a given member may be the number of individuals that member represents in the total universe and, therefore, adding the projection weights for each of the determined members may provide the total number of individuals in the total universe that visited one of the beaconed web page of the web entity.

The personal device module 304a determines, based on the pre-processed panel-centric data, a count of the total number of beacon cookies for a given web entity (504). For example, the personal device module 304a may determine the client systems in the pre-processed panel-centric data that accessed a beaconed web page of the web entity. For each of those client systems, the personal device module 304a may then determine the number of different cookies sent with the beacon messages (also referred to as "beacon cookies") from the client system during the reporting period. As described above, for client systems in which the panel application is installed, the panel applications can also record and report the beacon message and any associated cookie (beacon cookie). For each of those client systems, the personal device module 304a then may generate a projected cookie count for the client system by applying the projection weight for the user of the client system to the number of different beacon cookies sent by the client system during the reporting period. The personal device module 304a then adds the projected cookie counts together to determine a count of the total number of beacon cookies for the web entity. If there is more than one user of a given client system, the projection weights for those users may be averaged and the averaged weight may be applied to the count of different beacon cookies for that client system to determine the projected cookie count.

Once the total unique visitors and total cookies for a given web entity are determined, the personal device module 304a determines the cookie-per-person adjustment factor by taking the ratio of total cookies to total unique visitors. In other words, the personal device module 304a determines Cookie-Per-Person as:

$$\text{Cookie-Per-Person} = \text{Total Cookies}/\text{Total Unique Visitors}$$

where Total Cookies is a count of the total number of beacon cookies for the web entity and Total Unique Visitors is a count of the total number of unique visitors for the web entity. As noted above, the reciprocal of the Cookie-Per-Person adjustment factor (Person-Per-Cookie) may be used. The Person-Per-Cookie factor may be determined by determining Total Unique Visitors/Total Cookies.

Figure 6:
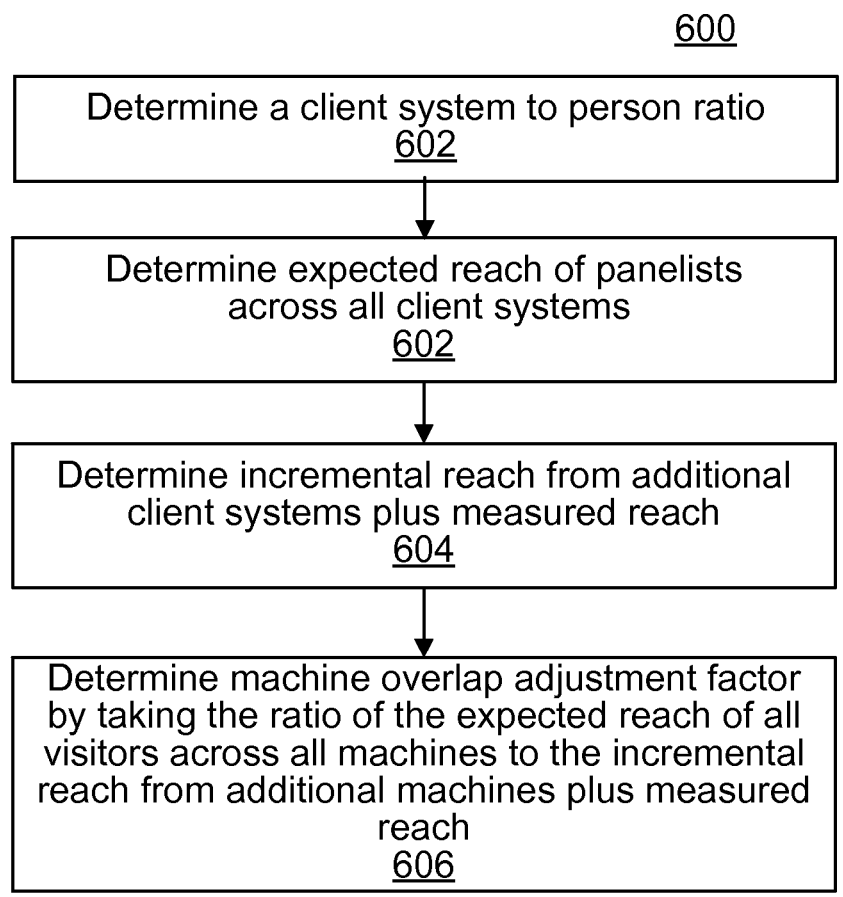
FIG. 6 is a flow chart illustrating an example of a process for determining a machine overlap adjustment factor.

FIG. 6 is a flow chart illustrating an example of a process 600 for determining a machine overlap adjustment factor. The following describes process 600 as being performed by the personal device module 304a. However, the process 600 may be performed by other systems or system configurations. As noted above, this adjustment factor may be used to adjust the initial audience measurement data for a given web entity. Thus, the following describes an implementation of process 600 in which the actions 602 to 606 are performed on a web entity basis.

The personal device module 304a determines, based on the pre-processed panel-centric data, a client system to person ratio for a given web entity (602). As described above, a given user may have and use multiple client systems in a given location (for example, at home). As a result, separate cookies may be set on the multiple client systems, and counted, even though only a single user is visiting the web entity. Based on the pre-processed panel-centric data, a client system to person ratio for a given web entity can be determined for the entire universe of users and client systems being measured (e.g., the universe of all Internet users and client systems, or those in a particular geographic region). To determine the client system to person ratio for a given web entity, the personal device module 304a may determine the total number of client systems in the defined universe that accessed the web pages of the web entity and the total number of users in the defined universe that accessed the web pages of the web entity, and then determine the ratio of these two numbers.

As described above, there may be projection weights for projecting users to the total number of Internet users (or Internet users in a particular geographic region), or other defined user universe, as well as projection weights for projecting client systems to the total universe of client systems accessing the Internet (or, at least, the total in a particular geographic region), or other defined client system universe. Thus, to determine the total number of client systems in the defined universe that accessed the web pages of the web entity, the personal device module 304a may determine the client systems in the pre-processed panel-centric data that accessed web pages of the web entity during the reporting period, and add up the projection weights for those client systems to determine the total number of client systems in the defined universe that accessed the web pages of the web entity. Similarly, to determine the total users, the personal device module 304a may determine the users in the pre-processed panel-centric data that accessed web pages of the web entity during the reporting period, and add up the projection weights for those users to determine the total number of users in the defined universe that accessed the web pages of the web entity.

Based on the client system to person ratio, the personal device module 304a determines the expected reach based on all of the panelists in the pre-processed panel-centric data across all of the client systems on which those panelists are active (604). In general, reach is the percentage of users, out of the total universe of users, that visited a web page of a given web entity during a certain period, such as the reporting period. In other words, reach is the percentage of the total possible visitors that visited a web page of the web entity.

The expected reach based on all panelists across all client systems on which they are active may be calculated using:

$$\frac{pRE}{1+(E-1)p\frac{\ln\left(\frac{E-1}{S-1}\right)}{\ln(T)}}$$

or $$\frac{(1+q)RE}{1+(E-1)(1+q)\frac{\ln\left(\frac{E-1}{S-1}\right)}{\ln(T)}}$$

where:
p=the client system to person ratio, or $$\frac{M_p}{R_p};$$

q=the incremental number of client systems used by people=(p−1), assuming no shared use machines such that people use at least one machine;
T=the reporting period measured in days (e.g., 30 days);
R=the projected reach over the reporting period T;
E=the frequency of visitations per visitor to a web page of the web entity during period T;
S=the average visits to a web page of the web entity per day during period T.

The projected reach, R, over the reporting period T may be determined by using the pre-processed panel-centric data to determine the projected number of users that visited a web page of the web entity during the reporting period and dividing that value by the total estimated universe of users. The frequency of visitations per visitor to a web page of the web entity, E, may be determined by using the pre-processed panel-centric data to determine the total visits to a web page of the web entity during the reporting period and the total visitors to a web page of the entity during the reporting period, and then dividing those two numbers. The average page visits to a web page of the web entity per day, S, may be determined by using the pre-processed panel-centric data to determine the total number of unique visits in each day of the reporting period, add these values together, and then divide by the total number of days in the reporting period.

Based on the client system to person ratio, the personal device module 304a determines the incremental reach not measured due to the client systems used by members of the panel, but not included in the panel plus the reach, R, measured by the panel (506). This expected reach gain from the incremental machine activity not measured by the panel can be determined using:

$$\frac{qRE}{1+(E-1)q\frac{\ln\left(\frac{E-1}{S-1}\right)}{\ln(T)}}$$

This incremental reach can then be added to the measured reach, R.

The personal device module 304a determines the machine overlap adjustment factor by determining the ratio of the expected reach across all client systems to the incremental reach plus measured reach (508). In other words, the personal device module 304a may determine the machine overlap adjustment factor based on the following:

$$\frac{\frac{(1+q)RE}{1+(E-1)(1+q)\frac{\ln\left(\frac{E-1}{S-1}\right)}{\ln(T)}}}{R+\frac{qRE}{1+(E-1)q\frac{\ln\left(\frac{E-1}{S-1}\right)}{\ln(T)}}}$$

Which simplifies to:

$$\frac{(1+q)E}{1+\dfrac{qE}{1+(E-1)(1+q)\dfrac{\ln\left(\frac{E-1}{S-1}\right)}{\ln(T)}}}{1+\dfrac{qE}{1+(E-1)q\dfrac{\ln\left(\frac{E-1}{S-1}\right)}{\ln(T)}}}$$

As an alternative to first calculating the expected reach, calculating the incremental reach plus measured reach, and then dividing the two, the personal device module 304a may determine the machine overlap adjustment factor based directly on the simplified equation above. For instance, the personal device module 304a may determine the client system to person ratio as described above, determine the incremental number of client systems used by people based on the machine to person ratio (e.g., by determining p–1), determine the frequency of visitations per visitor to a web page of the web entity as described above, determine the average visits to a web page of the web entity per day as described above, and then determine the machine overlap adjustment factor based on q, E, S, and T using the simplified equation above.

Moreover, if the composition of users and client systems in the defined universe is estimated accurately and taken into account correctly when determining projection weights for the users and client systems in the panel, then the client system to person ratio may be used directly as the machine overlap adjustment factor. However, such perfect estimating and weighting may be very difficult to accomplish. For instance, there may be a mix of primary (those used by a user most often to access the Internet) and secondary (those use less often) machines in the panel, but the exact mix may not be known. So, depending on the sample composition and the site, the client system to person ratio may be skewed more towards secondary usage or primary usage. To compensate for such errors, the client system to person ratio may be used as described above with the expected and incremental reaches to determine a machine overlap adjustment factor that compensates for the possible errors in estimating the universe and weighting. If the simplified equation above is used and the expected combined reach is greater than the addition of incremental reach to measured reach, the sample is skewed more towards secondary usage for the web entity and the machine overlap factor will scale up unique visitors. On the other hand, if the expected combined reach is less than the addition of incremental reach to measured reach, then the sample is skewed more towards primary usage and the machine overlap adjustment factor will scale down unique visitors to account for incremental secondary usage.

Figure 7:
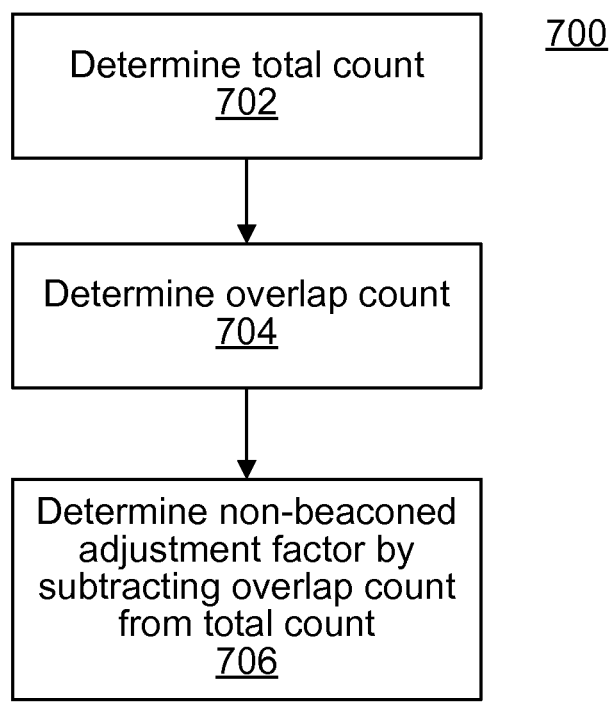
FIG. 7 is a flow chart illustrating an example of a process for determining a non-beaconed adjustment factor.

FIG. 7 is a flow chart illustrating an example of a process 700 for determining a non-beaconed adjustment factor. The following describes process 700 as being performed by the personal device module 304a. However, the process 700 may be performed by other systems or system configurations. As noted above, this adjustment factor may be used to adjust the initial audience measurement data for a given web entity. Thus, the following describes an implementation of process 700 in which the actions 702 to 706 are performed on a web entity basis.

The personal device module 304a, depending on the particular audience measurement, determines a total count of the unique visitors or page views for a given web entity based on the pre-processed panel-centric data (702). As described above, since, ideally, the panel applications capture all web traffic, visits to non-beaconed web pages for a given web entity are also captured and reported by the panel applications. As a result, the personal device module 304a may use the pre-processed panel data to determine a total count of the unique visitors or page views for a given web entity, even if all of the web pages for a web entity do not include beacon code.

For instance, the total number of unique visitors may be determined by adding up the projection weights for each of the members of the panel in the pre-processed panel-centric data that visited a web page of the web entity. The total number of page views may be determined, for instance, by applying each member's projection weight to the count of page views for the member to generate a projected page views for the member, and then adding together all of the projected page views.

The personal device module 304a, depending on the particular audience measurement, determines an overlap count of the unique visitors or page views for a given web entity, based on the pre-processed panel-centric data (704). An overlap count of the unique visitors or page views are the number of unique visitors or page views attributable to visits to web pages that included the beacon code. To determine the overlap count of unique visitors, the personal device module 304a, for example, may add together the projection weights for members in the pre-processed panel-centric data that visited a web page of the web entity and that sent a beacon message with a beacon cookie. To determine the overlap count of page views, the personal device module 304a, for example, may determine the members in the pre-processed panel-centric data that visited a web page of the web entity and that sent a beacon message with a beacon cookie, determine the number of page views for each of those members, apply the projections weights for each member to the respective number of page views for the member to generate projected page views, and then add together the projected page views to obtain a total overlap count of page views.

The personal device module 304a, depending on the particular audience measurement, determines a non-beaconed adjustment factor by subtracting the total count of the unique visitors or page views for a given web entity from the overlap count of unique visitors or page views for the web entity (706). As noted above, the non-beaconed adjustment factor is used to adjust for the non-beaconed web pages. Thus, the overlap count is removed from the total count of unique visitors or page views (which includes unique visitors or page views for both web pages with beacon code and web pages without beacon code) to arrive at an adjustment factor that reflects unique visitors or page views attributable only to those web pages of the web entity that do not contain beacon code. In other words, Non-Beaconed is determined based on:

Non-Beaconed=Total Count−Overlap Count where Total Count is the projected total count of unique visitors or page views for the web entity (for both beaconed and non-beaconed pages) based on the pre-processed panel-centric data and Overlap Count is the projected count of unique visitors or page views attributable to web pages of the web entity that include beacon code.

The above techniques are used on usage data which is understood to represent personal computing devices, such as work and home computers. Once a count for unique visitors is determined for personal computing devices, this count is used along with other usage data in order to arrive at a total count of unique visitors over all devices as further described below.

Establishing Unique Visitors on Mobile Devices

Internet usage is not confined to home and work personal computers. Increasingly, mobile devices form an important component of the internet audience that a business may wish to measure.

Mobile devices may, in some cases, provide unique challenges to determining a count for unique visitors. The methods described rely on the use of cookie beacons and usage data based on beacon information. However, many mobile device platforms are unreliable in their acceptance and maintenance of cookies. For example, some mobile device platforms include internet browsers that refuse third-party cookies, and many have default settings that either refuse cookies or clear them quickly. This makes it more difficult to collect internet usage data that is measured, for instance, on a monthly basis.

In some implementations, mobile usage data will be collected both for devices having beacon cookies and for devices without cookies. For mobile devices without cookies, the device's IP address may be used to uniquely identify access by the device.

Figure 8:
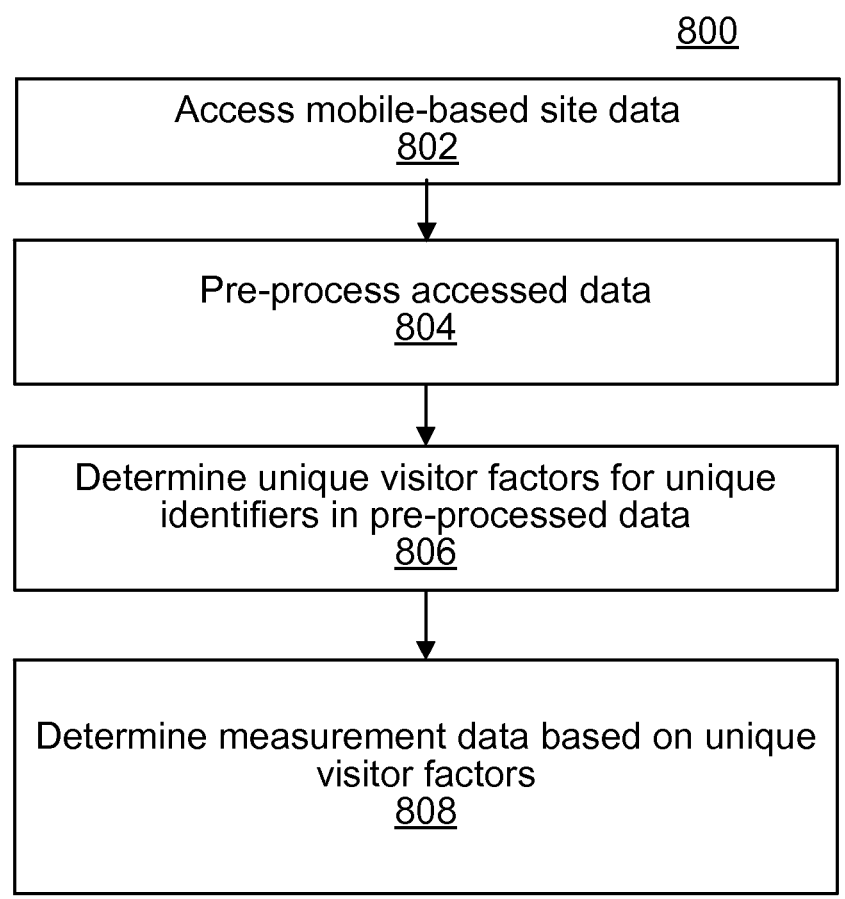
FIG. 8 is a flow chart illustrating an example of a process for determining measurement data for mobile devices.

FIG. 8 is a flow chart illustrating an example of a process 800 for determining measurement data for mobile devices. The following describes process 800 as being performed by the mobile device module 304b. However, the process 800 may be performed by other systems or system configurations.

The mobile device module 304b accesses mobile-based site-centric data (802) and may perform some pre-processing (804). The pre-processing may include standardizing data if any of the servers use nonstandard formats, consolidating data from multiple sources, and eliminating or reclassifying data that does not fit with the remainder of the process. In some implementations, as part of pre-processing the usage data, data associated with mobile applications may be removed. This data may be processed separately as described further below.

The pre-processed data may include records with unique identifiers and, for a given unique identifier, information indicating each time a tracked resource was accessed (that is, each "hit"), along with a time stamp associated with each hit. When beacon cookies were included in the beacon messages, then the unique identifiers in the beacon cookies can be used. If a beacon cookie was not present, then a network identifier, such as an IP address, may be used as the unique identifier.

Once the data is pre-processed, the mobile device module 304b determines a unique visitor factor for each entry associated with a unique identifier (806). The unique visitor factor acts as an adjustment factor for unique identifiers that are not suitable for interpreting 1-for-1 as unique visitors. In general, under certain circumstances, a unique identifier can be considered to correspond to one person. As a result, an access of a resource associated with that unique identifier can be considered an access by one unique person. However, under certain circumstances, this assumption is not appropriate. For example, because many mobile device platforms are unreliable in their acceptance and maintenance of cookies, a given user may receive more than one cookie over a certain reporting time period (for example, one month) and, as a result, may be counted as more than one person. As a result, it may be appropriate to count such cookies as less than a person when determining unique views. As another example, IP addresses may be assigned to different people over the course of the reporting period. As a result, a given IP address may only be counted as one person when, in fact, it represents more than one person. As a result, it may be appropriate to count such IP addresses as more than a person when determining unique views.

In order to account for such circumstances, a consideration set of unique identifiers is developed and used to determine unique visitor factors for each unique identifier to act as adjustment factors. The consideration set is populated with those unique identifiers that have a high probability of corresponding to a single person. In one implementation, the consideration set is populated with unique identifiers that correspond to cookies that are present in the data over a duration that exceeds a persistence threshold. In other words, the consideration set corresponds to cookies that are present for a threshold amount of time during the reporting period. An example of a process for determining unique visitor factors is described below in conjunction with FIG. 9.

The measurement data is then determined based on the unique visitor factors (808). In some implementations, the unique factors can be summed over a set of data in order to arrive at a number of unique visitors. All the unique visitors factors associated with records meeting a particular criterion can be added up to determine a unique visitor count for that criterion. For example, the unique visitor factors for each record of a device accessing a particular web entity can be summed to a total number of unique visitors to that web entity.

Figure 9:
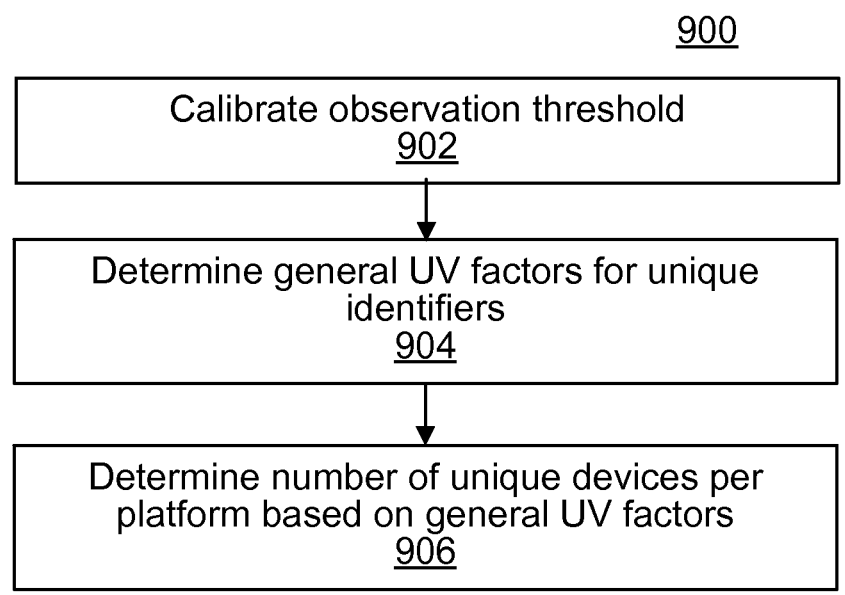
FIG. 9 is a flow chart illustrating an example of a process for assigning general unique visitor factors to mobile device usage data.

FIG. 9 is a flowchart illustrating an example of a process 900 for determining general unique visitor ("UV") factors for unique identifiers and using those to determine the number of devices per platform. Generally, the process involves defining a consideration set represented by persistent cookies—those cookies for which the record of activity exceeds a threshold. This data is used to evaluate the remainder of the data, which includes non-persistent cookies and persistent or non-persistent IP addresses.

The mobile device module 304b calibrates an observation threshold (902). The observation threshold may not be calibrated every time; in some implementations the threshold may be calculated off-line and only adjusted at a set interval, such as annually, even if other steps of the process 900 are carried out for each measurement period, such as monthly.

In some implementations, the calibration may involve comparing the data to some further external source that estimates the number of unique devices per platform. The data may be sorted or categorized to match the external source. For example, in some implementations, the data may include mobile devices from several different mobile platforms. Each platform represents a different basic software framework developed for mobile use, and includes a mobile device's operating system. The mobile device module 304b sorts the usage data according to the platform of the mobile device and compares the usage data to a source that gives an estimate of the number of unique devices per platform.

The mobile device module 304b may iterate through different observation thresholds until it finds one where the formula for calculating UVs based on categorizing the data into persistent and non-persistent records, as further described below, gives results that most closely match the estimated data. In other words, the mobile device module 304b may perform actions 904 and 906 using different values for the observation threshold to arrive at different counts for unique devices per platform. The mobile device module 304b may then select the observation threshold that results in the count of unique devices per platform to most closely match the external source for unique devices per platform. For example, the mobile device module 304b may calculate unique devices per platform based on an observation threshold of 5 days, 10 days, 15 days, and 20 days, and find that unique devices per platform calculated based on a 20-day observation threshold matches the estimated data more closely than the others. The mobile device module 304b may then calculate unique devices per platform based on observation thresholds of 20, 22, 24, and 26 days. Upon determining that an observation threshold of 24 days results in the closest match to the estimated data, 24 days may be used as the observation threshold (or "obs_threshold").

The mobile device module 304b determines general UV factors for unique identifiers (904). Using the example of 24 days, the data is sorted based on its persistence and the presence or absence of a beacon cookie. Persistent cookies or IP addresses are those that include events over a longer period of time than the threshold. In some implementations, the difference in days between the most recent and the oldest time stamp associated with a cookie or IP address may be compared against a threshold, such as 24 days, such as by the use of the following equation:

$$days\_obs = newest\_stamp - oldest\_stamp$$

If the cookie's or IP address's timestamps span a duration equal to or exceeding the threshold, for example if the oldest stamp is at least 24 days older than the newest stamp, then the cookie may be classified as persistent. This yields four classes of data: persistent cookie data, non-persistent cookie data, persistent IP data, and non-persistent IP data. The following can be used to calculate the UV factor for each category.

| | |
|---|---|
| Persistent Cookie Data<br>Cookie = TRUE<br>days_obs >= obs_threshold | UV = 1 |
| Non-Persistent Cookie Data<br>Cookie = TRUE<br>days_obs < obs_threshold | UV =<br>MIN (days_obs / obs_threshold, hits / PCI) |
| Persistent IP Data<br>Cookie = FALSE<br>days_obs >= obs_threshold | UV = MAX (1, hits / PCI) |
| Non-Persistent IP Data<br>Cookie = FALSE<br>days_obs < obs_threshold | UV = MAX (1, hits / PCI) *<br>(days_obs / obs_threshold) |

The first category, persistent cookie data, may act as a consideration set and provide a baseline for the other categories. The UV factor for unique identifiers in this class is set to 1. That is, each cookie is considered to represent one unique visitor. In some implementations, the average number of hits per cookie for the data in this category is used to evaluate data in the other categories to set the UV factor. The average hits per cookie for data in the persistent cookie data category is referred to as the persistent cookie intensity, or "PCI".

The second category, non-persistent cookie data, may result in over-counting unique visitors if a UV factor is not applied. For example, a mobile device could clear and re-install cookies once a week, in which case one user may have accessed a resource with each of four different cookies. Ideally, each of these cookies is counted as only a fraction such that all of the cookies associated with one individual end up totaling to 1 in the UV count. This can be accounted for by setting the general UV factor to the minimum value of either the ratio of the days observed for the particular cookie (that is, the difference in days between the last and the first time stamp) and the threshold number of days to be considered persistent (days_obs/obs_threshold) or the ratio of the hits from the particular unique identifier to the persistent cookie intensity (hits/PCI).

For IP address records (the third and fourth categories), multiple users may use the IP address over a month, which can result in under-counting. For example, several mobile devices connected through a wireless router may be considered to have the same IP address. Furthermore, many 3G and other mobile data services use floating IP addresses that may be assigned to several users over the course of the month. To compensate, the level of activity associated with the IP address may be used as a proxy for the number of individuals using it.

In particular, for persistent IP data (the third category), if a particular IP address had more hits than the average number of hits for persistent cookie data (that is, the persistent cookie intensity), then that IP address is assigned a UV factor of greater than 1 according to the ratio that it exceeds the PCI. In other words, the UV factor is set to the maximum value of either 1 or the ratio of hits from the particular IP address to the persistent cookie intensity (hits/PCI). For non-persistent IP data (the fourth category), the same formula is used, except that the UV factor is multiplied by a factor reflecting how short-lived the record is.

In some implementations, the above formulas may use the data specific to each platform. Particularly, the data may be segregated by platform and the UV factors calculated for each platform. In some implementations, persistent cookie data for each platform may be used to calculate a PCI that is specific to that platform, which is then used in determining the UV factor for the other classes of data for that platform.

The mobile device module 304b determines the number of unique devices per platform based on the general UV factors (906). For instance, the general UV factors for each platform can be summed to arrive at a total count of devices for that platform.

Figure 10:
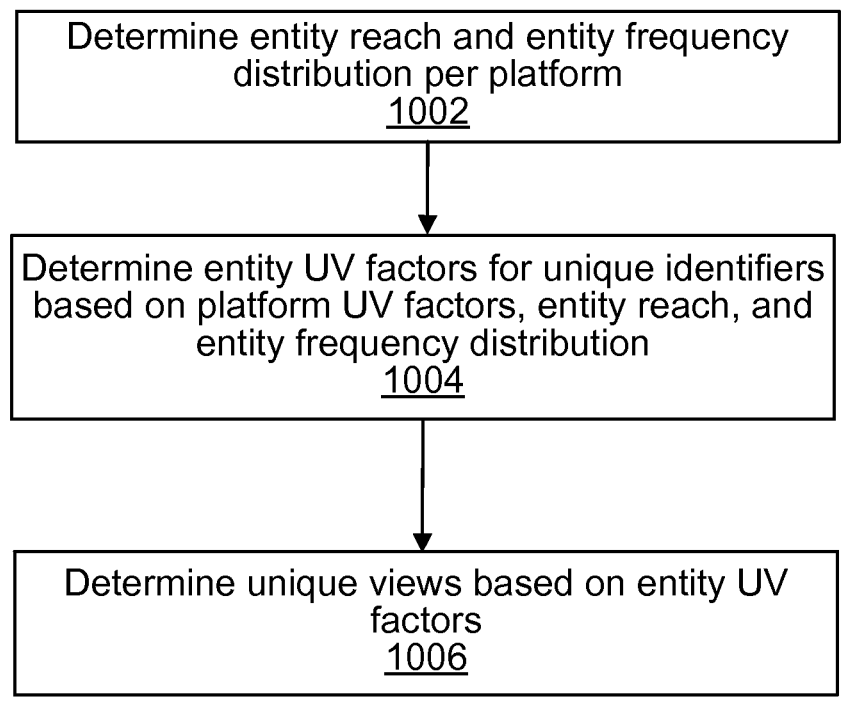
FIG. 10 is a flow chart illustrating an example of a process for calculating entity unique visitor factors.

FIG. 10 is a flowchart illustrating an example of a process 1000 for determining unique views for a resource or set of resources (generally referred to as an entity, as explained above). Generally, process 1000 involves determining an entity UV factor for each unique identifier that visited a given entity based on the general UV factors and the reach/frequency of the entity. The following describes process 1000 as being performed by the mobile device module 304b. However, the process 1000 may be performed by other systems or system configurations.

For a given entity represented in the mobile usage site-centric data, the mobile device module 304b determines an entity reach and a hit frequency distribution per platform (1002). The entity reach and hit frequency distribution is determined using the persistent cookie data. The entity reach can be determined as follows:

$$entity\ reach = (cookies\ per\ entity / total\ cookies\ over\ all\ entities)$$

where the cookies per entity is a count of the number of unique identifiers that accessed the entity and the total cookies over all entities is a count of the all the unique identifiers in the persistent cookie data. For example, if 80% of all persistent cookies have at least one hit on a given website, the reach for that entity will be 0.8.

The mobile device module 304b may also determine the hit frequency distribution for the entity for each platform. This represents the fraction of persistent cookies recording a particular number of hits for the entity, according to the persistent cookie data. For a particular platform and entity, a frequency distribution may look like this:

| | |
|---|---|
| 1 hit | 0.8 |
| 2 hits | 0.1 |
| 3 hits | 0.05 |
| 4 hits | 0.02 |
| 5 or more hits | 0.03 |

The entity reach and frequency distribution are both used in order to determine an entity UV factor for unique identifiers that do not correspond to persistent cookies (1004). For example, the following may be used to determine the entity UV for each unique identifier for a given entity:

| | |
|---|---|
| Persistent Cookie Data<br>Cookie = TRUE<br>days_obs >= obs_threshold | entity UV = 1 |
| Persistent IP Data<br>Cookie = FALSE<br>days_obs >= obs_threshold | entity UV = MAX (1, general UV factor * reach) |
| Non-Persistent Cookie Data<br>Cookie = TRUE<br>days_obs < obs_threshold | entity UV =<br>{IF general UV factor > 1, general UV factor * reach IF general UV factor <=1, MAX (general UV factor, entity frequency) |
| Non-Persistent IP Data<br>Cookie = FALSE<br>days_obs < obs_threshold | entity UV = MAX (general UV factor, entity frequency) |

The general UV factor is the general UV factor described above and, when appropriate, is scaled by the reach to achieve the entity UV factor. The entity frequency refers to the hits frequency found in the frequency distribution for the particular entity and platform corresponding to the unique identifier. For example, a non-persistent cookie or IP with 3 hits would, based on the above example of a frequency distribution, have an entity frequency of 0.05.

The mobile device module 304b determines the number of unique web views (or accesses), as opposed to mobile app accesses, to the entity based on the entity UV factors (1006). For instance, the entity UV factors for each platform can be summed to arrive at a total count of unique views per platform, and then those unique views per platform can be summed.

Figure 11:
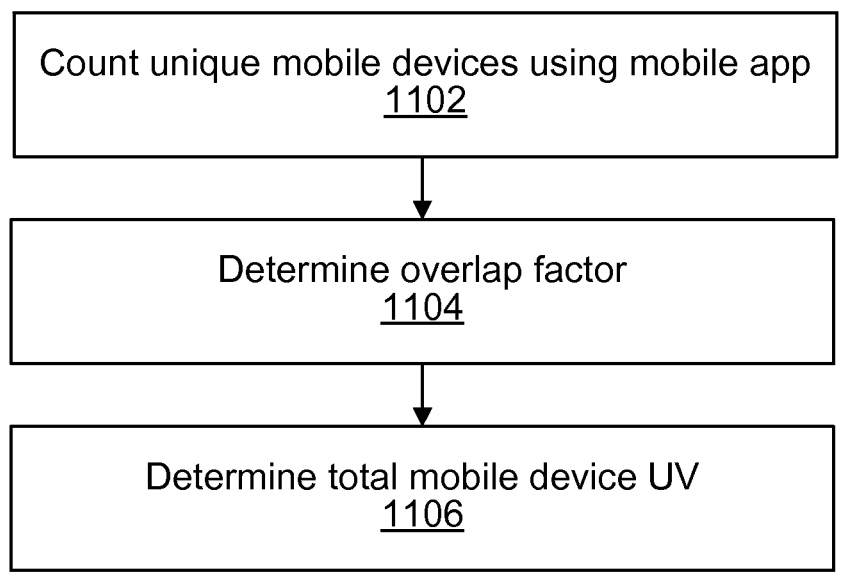
FIG. 11 is a flow chart illustrating an example of a process for measuring the total audience for mobile devices.

FIG. 11 is a flowchart illustrating an example of a process 1100 for determining total mobile unique views for an entity. Generally, in process 1100, entity accesses by mobile apps are added to the count of mobile web views in order to measure the total audience for mobile devices. The following describes process 1100 as being performed by the mobile device module 304b. However, the process 1100 may be performed by other systems or system configurations.

The mobile device module 304b counts the number of unique mobile devices using the mobile app to access the entity (1102). Referring briefly to FIG. 2, each mobile app 210 may have access to a unique device identifier for the mobile device upon which it resides and that device identifier may be returned in a beacon call. Therefore, the mobile device module 304b may count the number of unique mobile devices using the mobile app by counting the number of unique device identifiers recorded as having visited the entity. In some cases, the device identifiers are uniquely and permanently assigned to the device, so the issues related to mobile web views and cookies do not apply. As a result, in those circumstances, it may be assumed that each device identifier corresponds to one person.

The mobile device module 304b determines an overlap factor between the mobile web and mobile app accesses is determined (1104). While it may be appropriate to assume a unique device identifier corresponds to a single person, that person may nevertheless also have accessed the entity via the web page and, in a count of unique visitors, would be counted twice. The overlap factor may be used to take into account such overlap of visitation.

Figure 14:
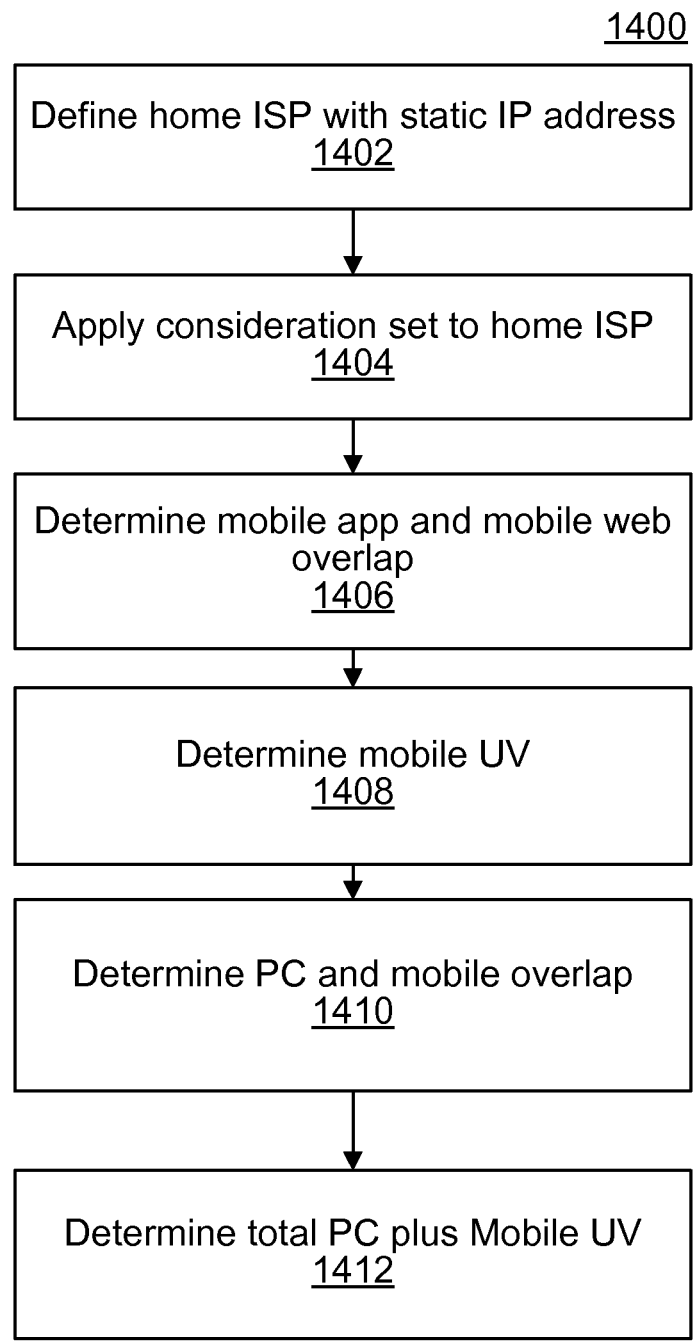
FIG. 14 is a flow chart illustrating an example of a process for combining personal device and mobile device unique visitor counts into a single unique visitor count.
Figure 15:
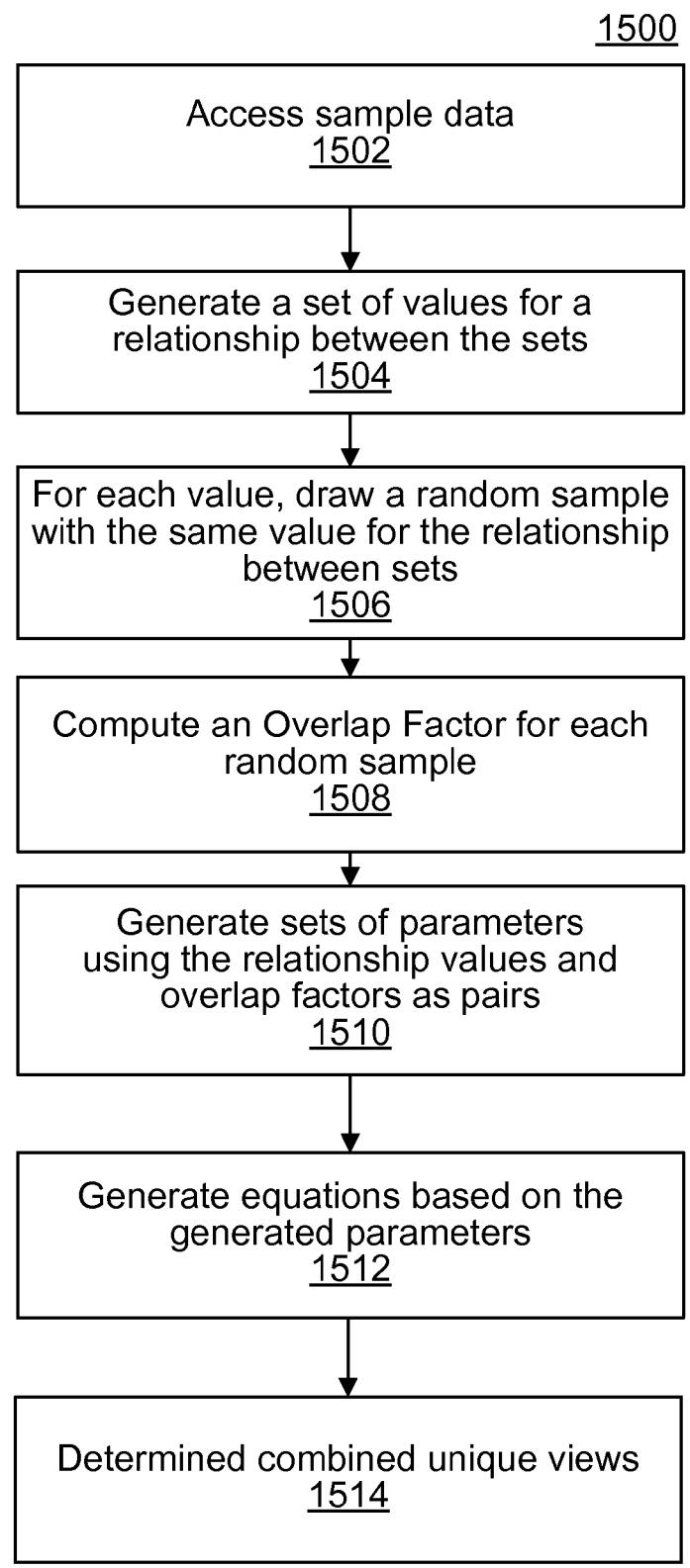
FIG. 15 is a flow chart illustrating an example of a process for generating overlap factors for combining multiple sets.

For instance, the overlap factor can be calculated as described with respect to FIGS. 14 and 15.

The mobile device module 304b determines the total mobile unique views for the entity (1106). For instance, the following formula may be used to apply the overlap:

Mobile UV=Mobile Web UV+(1−Overlap Factor)
*Mobile App UV

The above techniques are used on usage data which is understood to represent mobile devices, such as smart phones and tablet computers. Once a count for unique visitors is determined for mobile devices, this count may be used along with other usage data in order to arrive at a total count of unique visitors over all devices as further described below.

Establishing Unique Visitors on Shared Use Computers

In addition to personal computing devices and mobile devices, internet use also occurs on computers made available to members of the public to use on a short-term basis. Libraries, community centers, and internet cafes among other locations provide internet use that, in some countries, represents a significant fraction of the internet audience.

In measuring unique visitors for shared devices, a basic assumption that equates the number of devices with the number of users may be inapplicable here. A particular shared device may have several unique users each day and a user is likely to use multiple shared use devices during a reporting period.

Figure 12:
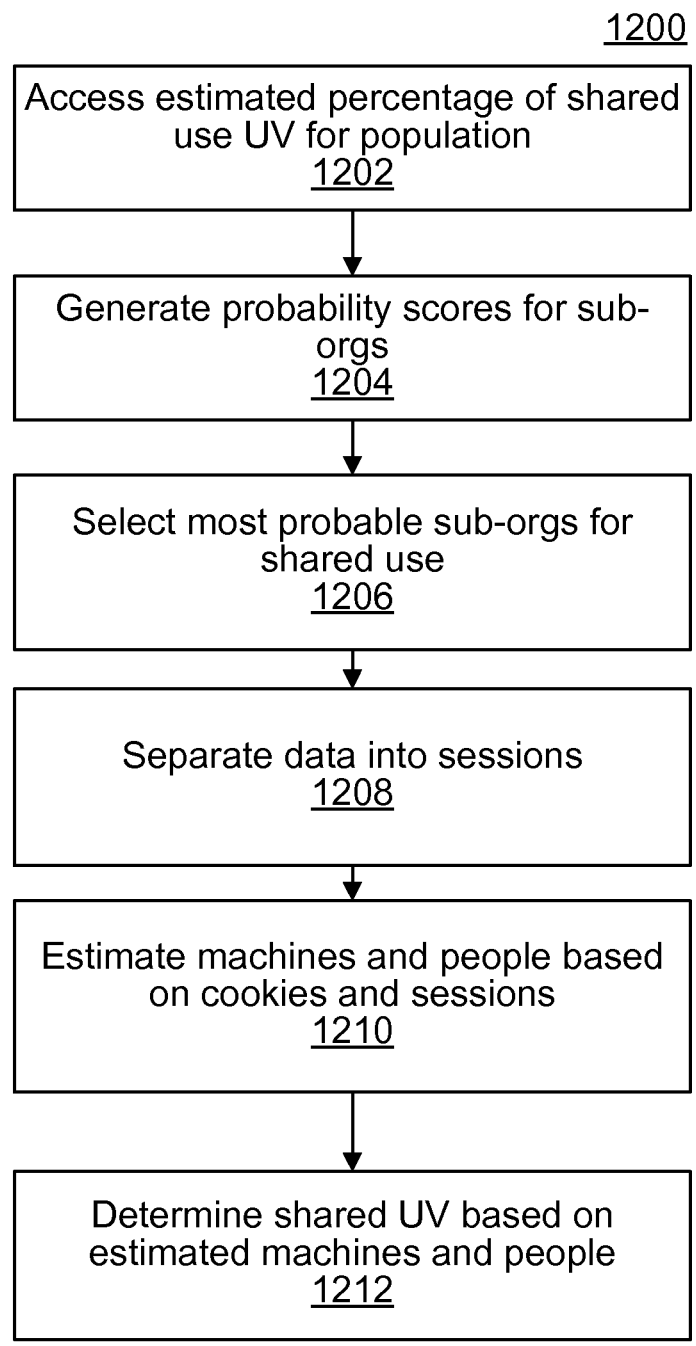
FIG. 12 is a flow chart illustrating an example of a process for identifying and measuring shared device usage data.

FIG. 12 is a flowchart illustrating an example of a process 1200 for identifying and measuring shared use device activity. The following describes process 1200 as being performed by the shared use module 304c. However, the process 1200 may be performed by other systems or system configurations.

The shared use module 304c accesses an estimated percentage of unique visitors that should come from shared use devices within the population being measured (1202). This information may come from an external source, such as a survey or other separate means of measuring audience data. The data may be based on the relevant population for which the shared device usage data is to be measured; for example, the relevant population may be usage data associated with a given country. In other words, the estimated percentage may represent the estimated fraction of the total unique views for a given population, such as a country or region, that is expected to come from shared use devices. The estimated percentage may be estimated by survey data, from the use of a consideration set, or may be set dynamically based on other data interactions within the system.

The shared use module 304c divides the usage data according to IP address. Each IP address block of the two or three most significant octets in the IP address, referred to as a "sub-org", is analyzed to see if the usage data has characteristics of shared use.

Each sub-org is assigned a probability to determine whether it contains activity from shared devices (1204). The name of organizations possessing IP addresses in a block (such as "café", "university", or "library") may indicate shared use activity and may be used to establish a baseline for typical shared use behavior at the level of the address block. The level of activity during different times of day may indicate shared use activity; for example, a higher usage outside of office hours and on weekends may be indicative of shared devices. Also, cookies that refresh very frequently and are assigned more frequently may indicate a higher probability of shared use activity.

The sub-orgs are sorted based on a scored probability of being shared use, and the most probable are selected as shared use (1206). In some implementations, such as identifying a percentage of users who are shared-use only users, the accessed estimated percentage of unique visitors that should come from shared use devices is used in order to determine how many sub-orgs to identify and analyze as shared use. The most probable sub-org may be classified as shared use until the percentage of usage data represented by the classified sub-orgs matches the enumerated percentage for shared use. Alternatively, in some implementations, probabilities are compared against a threshold value, and all those sub-org probabilities above the threshold value are identified as the shared device usage data.

The shared device usage data corresponding to the sub-orgs classified as shared use is separated into sessions (1208). Sessions represent a window of time during which it is reasonable to estimate a single person may have used each machine in a shared use establishment. For example, each window may represent one hour of time, and so usage data is segmented according to the hour of the day in which it occurred.

The system uses the unique identifier present in the cookie data, separated into sessions, in order to estimate the total number of machines available for a particular location (for example, library or café), and a number of people that used those machines over a given period (1210). The number of machines is estimated by counting the number of cookies during any single session; the highest number of cookies recorded during a single session in a measurement period is considered to be the number of machines available for a particular shared use sub-org. The number of people is estimated by counting, for each session during a given period, the total number of cookies recorded during each session, and summing those cookies over the whole period. In some implementations, the period may be a day, and the sessions may each represent one hour of the day.

The estimated numbers of machines and persons can be used in conjunction with a projected reach-frequency equation in order to determine a number of unique visitors (1212). For instance, this may be accomplished by comparing intensity on the first day of the month to intensity over the whole month, using for example the following equation:

$$UV=Hits/(1+E_p*P\hat{}(\ln(E_p+1)/(S_p+1))/\ln(30))$$

The variable P in the above equation is a factor identifying the relationship of overall machine consumption to the consumption for a single person, as further described by the following equation:

$$P=(1+S_m*15\hat{}(\ln((E_m-1)/(S_m-1))/\ln(30)))/(1+S_p*15\hat{}(\ln((E_p-1)/(S_p-1))/\ln(30)))$$

Wherein $E_p$ represents the hits per person averaged over the entire month, $S_p$ represents the hits per person measured on the first day of the month, $E_m$ represents the hits per machine measured across the entire month, and $S_m$ the hits per machine estimated on the first day of the month.

For each identified location, which as described may be inferred based on the use of an IP address block with similar usage patterns, the above estimate and equation can be used to generate a shared device UV. When aggregated with the unique visitors measured at other locations, the result can be used to represent shared device unique visitors over the whole population.

The above techniques are used on usage data which is understood to represent shared use devices. Once a count for unique visitors is determined for shared devices, this count is used along with other usage data in order to arrive at a total count of unique visitors over all devices as further described below.

Combining Categories

Figure 13:
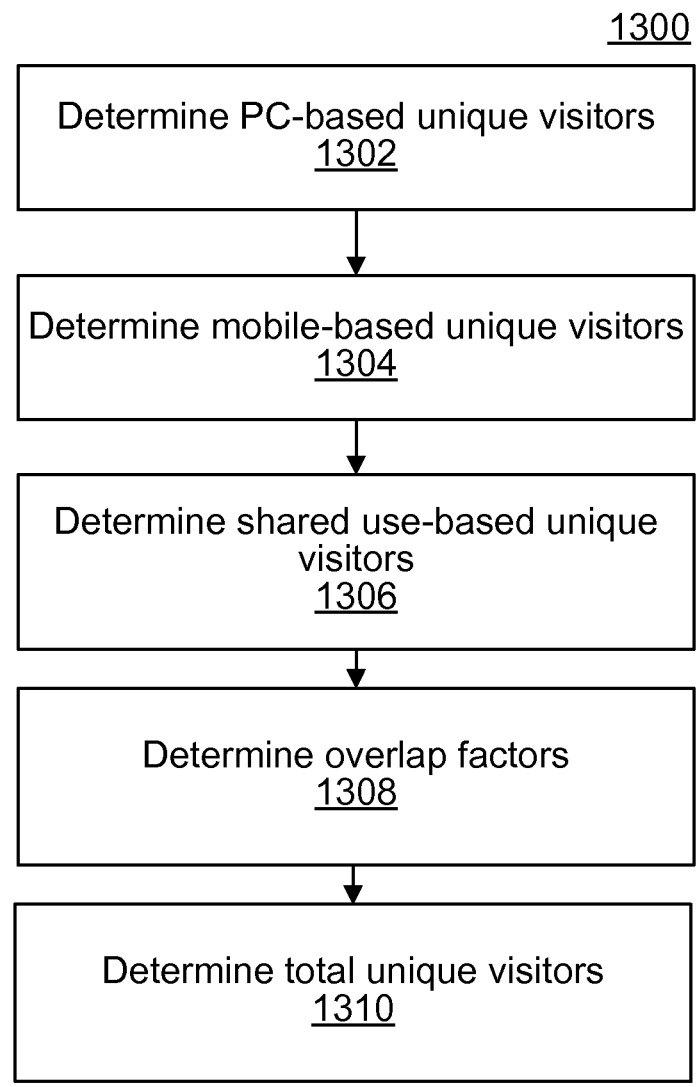
FIG. 13 is a flow chart illustrating an example of a process to combine unique visitors measured for different classified devices to produce a total count of unique visitors.

FIG. 13 is a flow chart illustrating an example of a process 1300 for determining the total unique visitors to a given entity. Generally, process 1300 involves combining the unique visitors to the entity measured for different classified devices to produce a total count of unique visitors. The following describes process 1300 as being performed by the overlap processor 306. However, the process 1300 may be performed by other systems or system configurations.

The overlap processor 306 determines a count of the unique visitors to the entity using personal computing devices (1302). The primary source of data, as described above, may be based on client devices responding to beacon instructions. The count may proceed according to the details explained above, and may generally be corrected or calibrated by the use of panel data as described herein.

The overlap processor 306 determines a count of unique visitors to the entity using mobile devices (1304). This data may be determined using the techniques described above. For instance, this data may be based on unique identifiers representing both cookies and IP addresses, both short-lived and persistent. Persistent cookies may be used to evaluate the rest of the data as described herein. Mobile app data may be removed in pre-processing and re-aggregated with mobile web data near the end of the process.

The overlap processor 306 determines a count of unique visitors to the entity using shared use devices (1306). This data may be determined using the techniques described above. For instance, this data may be based on usage segmented into sessions in order to estimate usage patterns for each location. A variety of factors may be used to identify which usage data should be attributed to shared use devices and evaluated by this method.

Having determined personal device UV, mobile device UV, and shared device UV, the overlap processor 306 then works to identify overlap factors between these three categories of use (1308). The total unique visitors to report for the whole population can then be determined by aggregating the different device UVs adjusted according to the overlap factors (1310).

Different processes are available for calculating overlap and aggregating unique visitors for different groups. FIG. 14 illustrates an example of a process 1400 for combining the personal device and mobile device UV counts into a single UV count reflecting both.

The system defines and identifies home ISPs with static IP addresses in order to generate a consideration set (1402). They are identified by finding persistent cookies within the personal device data that have activity within both the first five days and last five days of the month. Given this level of persistence, cookies are considered to be equivalent to machines.

The corresponding ISP name and hashed IP addresses corresponding to those cookies are identified. If any given IP address has more than 10 of these cookies, then all the cookies corresponding to that IP address are defined as coming from an enterprise rather than a household and not included the consideration set of static home ISPs. An ISP having at least 80% of the cookies with a single IP address and with less than 20% of the cookies coming from an enterprise is defined as a static home ISP.

The identified data is run as a consideration set for static ISPs (1404). All traffic observed for the month is included. The traffic is grouped by entity, platform and device, and IP address.

The system determines the number of distinct IP addresses having traffic classified as mobile web, traffic classified as mobile app, and traffic classified as personal device (that is, non-mobile traffic). The system also determines the number of distinct IP addresses having traffic qualifying under two or all three of these classifications. These data for the consideration set are used to generate the overlap factors.

First, the overlap factor between mobile web and mobile app is generated (1406). This may be, for example, the ratio of the IP addresses having traffic both for mobile web and mobile apps to all of the IP address having mobile app traffic.

The overlap factor is then used to determine the total mobile device unique visitors (1408). For example, where Overlap Factor=Mobile Web and App Count/Mobile App Count as described above, the combined mobile UV may be Mobile UV=Mobile Web UV+(1−Overlap Factor)
\*Mobile App UV In this way, the consideration set data may be used to estimate an overlap factor which is then used to combine the determined UVs to get a total UV count.

The overlap factor between mobile devices and personal devices may be generated in a similar fashion (1410). Here again, the overlap factor may be the ratio of IP addresses having both personal and mobile device traffic divided by the total number of IP addresses having mobile device traffic.

The PC-mobile overlap factor is then used to determine the total unique visitors for both personal and mobile devices (1412). For example, where Overlap Factor=Personal and Mobile Device Count/
Mobile Device Count as described above, the combined UV may be Total UV for mobile and PC=Personal Device UV+
(1−Overlap Factor)\*Mobile UV FIG. 15 illustrates an example of a process 1500 for generating overlap factors based on a set of sample data and using those factors to determine combined unique views. Generally, the process 1500 yields a function φ that takes as an input a relationship between the two sets, and returns an overlap factor for those two sets. The overlap factor is based on the actual overlap for the sample when the relationship is true for the sample data.

For purposes of illustration, the following examples will use the overlap of unique visitors for three sets P, M, and S, which represent personal computing device usage data, mobile device usage data, and shared use device usage data respectively for a given web entity w. As described, the process 1500 is used on two sets at a time to calculate an overlap and combine the UVs of those two sets. Therefore, to combine all three sets P, M, and S, the steps of the process can be carried out twice. The process 1500 will be illustrated by first combining personal computing device usage data P with mobile device usage data M. The process 1500 will then be used a second time in the combination of P with M will be combined with S, in order to arrive at a total UV count for the web entity w.

The overlap processor 306 accesses sample data (1502). The sample data may represent a survey, may be a consideration set of historical data, or may be another set of sample data for which population and overlap information is available. In some implementations, the sample data may represent panel data provided by client systems. The sample should generally include data that is characteristic of each of the two sets for which overlap is being calculated.

For example, for combining UVs for a web entity w, a survey may be given to a subset of visitors currently accessing the web entity w. The survey may be given, for example, in response to beacon data being sent from the client devices as the user accesses the web entity w. The resulting survey data may be used as the sample data. The survey data may include answers to two questions—the type of device the user is currently using to access the web entity w, and which other types of the devices the user regularly uses for accessing the internet. In one embodiment, this data may be represented by $P_W$, $M_W$, and $S_W$ representing the set of users currently using a personal computing device, mobile device, and shared device respectively to access the web entity w based on responses to the first question; this data forms a sample set of users accessing entity w. $P_I$, $M_I$, and $S_I$ may represent the set of users that use each of those devices regularly based on responses to the second question. This data may be used to help calculate the overlap between $P_W$, $M_W$, and $S_W$, as the survey itself may not directly establish the overlap between these sets. Because the same users are given both questions, the overlap sets $P_W \cap M_I$, $M_W \cap P_I$, $P_W \cap S_I$, $S_W \cap P_I$, $M_W \cap S_I$, and $S_W \cap P_I$ are also available from the survey data. For example, the size of the intersection of $P_W$ and $M_W$ may be estimated as follows:

$|P_W \cap M_W| = \mathrm{MIN}(|P_W \cap M_I|, |M_W \cap P_I|)$ That is, the number of users within the survey sample that access the entity w both on a personal computing device and on a mobile device can be estimated to be the lesser of the two of the number of users within the survey sample who reported currently accessing the entity w from a personal computing device and also regularly using a mobile device ($|P_W \cap M_I|$), and the number of users within the survey sample who reported currently accessing the entity w from a mobile device and also regularly using a personal computing device ($|P_I \cap M_W|$).

The overlap processor 306 generates a set of values for a relationship between the sets of sample data (1504). The relationship is one that influences the overlap factor between the two sets. For example, in one implementation, the ratio of the reach of the two sets influences their overlap factor. In some implementations, these values may be distributed over the entire domain of possible or expected values for the relationship itself.

For example, the ratio of the reach of two sets may typically be a value between 0.01 and 1. The relationship values of 0.01, 0.02, 0.05, 0.1, 0.2, 0.3 . . . may be included in the set of relationship values.

For each value in the set, the system draws a random sample from the sample data that satisfies the relationship value (1506). For example, for each of the above relationship values, a set $P'_W$ is randomly sampled from $P_W$. The randomly sampled set is chosen of a size such that $|M_W|/|P'_W|$ is equal to the relationship value, such as 0.05 or 0.3.

For each random sample, the system computes on overlap factor (1508). As above, the overlap factor for $M_W$ and $P'_W$ may be expressed as Overlap Factor $M_W$ and $P'_W=(\text{MIN}(|P_I' \cap M_W|, |P_W' \cap M_I|))/(|P_W'|+|M_W|)$ This value may vary for each different $P'_W$ for each different relationship value.

The overlap factors in conjunction with their relationship values are then organized as parameters in a data set, with each (relationship value, overlap factor) pair acting as a single data point (1510). In some implementations, transformations may be performed on some or all parameters in order to normalize them, and outlying points may be detected and discarded.

Using the parameters that pair each relationship value with its resultant overlap factor, the overlap processor 306 generates an equation φ based on the generated parameters (1512). In some implementations, the equation φ may represent a linear or parabolic extrapolation of the parameters. In some implementations, the equation φ may include value and slope constraints that may modify the equation from a straight extrapolation. The equation φ accepts a relationship value that expresses a relation (for example, ratio of reach) between two sets, and returns an overlap factor for unique visitors for those sets.

The overlap processor 306 then uses the equations to determine the combined unique views (1514). For example, the overlap processor 306 may generate the equation $\phi_{P,M}$, which can be used to return an overlap factor for the unique views in P and M by means of their reach ratio:

UV Overlap$_{P,M}$=$\phi_{P,M}(|P|/|M|)$

The UV overlap factor is then used to calculate unique views for personal and mobile devices for the web entity w:

Combined personal and mobile UV=(personal UV+mobile UV)*(1−UV Overlap$_{P,M}$)

Having determined the total unique views for the web entity w for personal and mobile devices, the same process can be used again, this time combining the survey data for personal and mobile devices, $PM_W$, and pairing it with the survey data for shared use devices, $S_W$.

As above, the overlap processor 306 may generate an equation $\phi_{PM,S}$ based on generating random samples of the survey data having certain relationship values and extrapolating the resulting overlap factors for the random samples. Once generated, the equation φPM,S may be used to generate a total UV across all three classifications of device, first by calculating the overlap between the combined personal and mobile data and the shared data:

UV Overlap$_{PM,s}$=$\phi_{PM,s}(|S|/|PM|)$

Where |PM| is the combined reach of the personal and mobile usage data. Once the overlap is known, the total UV can be calculated for the web entity w.

Total UV=(combined personal and mobile UV+shared UV)*(1−UV Overlap$_{PM,S}$)

By the use of reliable sample data that includes overlap data, it is possible to extrapolate an overlap factor for unique visitor counts for different devices.

Assessing Subsets of Usage Data

Information about resource access patterns across different types of devices may be determined using subsets of site-centric data 132b, in addition to, or as an alternative to the techniques described above. For example, the usage overlap between personal computers/devices and mobile devices may be determined based on subsets of the site-centric data.

As discussed above, a user may use multiple client systems in a given location (for example, at home). As a result, separate cookies may be set on the multiple client systems and counted, even though only a single user is visiting the web entity. This may lead to an overcounting of unique visitors. To account for this inaccuracy, one or more overlap factors may be determined. For example, as discussed with respect to FIGS. 13-15, overlap factors may be generated and used to produce a total count of unique visitors across multiple different platforms.

As discussed further below, a portion of the site-centric data 132b, rather than survey data or panel data, can be used as sample data to determine an overlap factor (See FIG. 15). In particular, data that indicates traffic from certain households (e.g., households that include one person having one personal computer and one mobile device) can be extracted from the site-centric data 132b and used to determine an overlap factor indicating overlap in usage of personal computers and mobile devices. Subsets of the site-centric data 132b can also be used to determine other overlap factors, such as overlap between other classes of devices. The overlap factors can then be used to combine the unique visitors measured for different classes of devices to produce a total count of unique visitors, as discussed in FIG. 13.

The site-centric data 132b describes network activity of many different users, who access resources using various numbers and types of client devices. From the site-centric data 132b, data representing the resource accesses of users or households that meet certain criteria may be selected. The selected data may be used in place of panel-centric data 132a to determine various usage measures, including, for example, usage overlap of devices of a first type and devices of a second type. In some implementations, the techniques described below permit overlap factors and other measures of multi-platform usage to be determined without panel-centric data 132a.

In further detail, the site-centric data 132b may be analyzed to identify qualified households that satisfy a set of selection criteria. As an example, qualified households are those that appear to be associated with a defined number of users, and defined number and type of devices. For instance, qualified households may be those households that appear (based on the site-centric data 132b) to contain a single user that uses exactly one device of a first type and exactly one device of a second type. Once a set of qualified households is determined, the portion of the site-centric data 132b corresponding to the set of qualified households may be extracted and the extracted data may be used to determine metrics such as a measure of overlap in resource accesses among the different types of devices.

As noted above, the site-centric data 132b includes information about beacon cookies. In some implementations, beacon hits for resources in different Internet domains provide data to the same collection server 130. As a result, the same beacon cookie is provided to the collection server 130 for accesses to resources in different domains. For example, if a device accesses resources in domains "latimes.com," "nytimes.com," and "wsj.com," corresponding beacon hits can provide information about the same beacon cookie. Beacon hits associated with the same beacon cookie are known to correspond to the same device, or more particularly, to the same user agent (e.g., web browser) of a single device.

The overall process of identifying qualified households and using the corresponding site-centric data to determine certain metrics may be performed, for example, periodically based on site-centric data accumulated over an earlier time period (such as the past 30 days). In this case, different sets of households may satisfy the selection criteria at different times. The set of qualified households identified for a particular set of site-centric data 132b for a particular time period may be different from the set of qualified households identified for another set of site-centric data 132b or another time period. As a result, the resource accesses of different sets of qualified households are used to measure overlap for data collected at different times. Because the set of qualified households is dynamically determined based on the site-centric data 132b, the set of qualified households can be considered to be a "dynamic panel."

In some implementations, the set qualified households whose network activity is used to measure usage overlap across multiple devices may be determined for each of several different time periods, based on the data obtained during respective time periods. For example, the set of qualified households whose resource accesses are used to estimate overlap may be determined using the resource accesses occurring during a particular month, such as the previous month.

Figure 16:
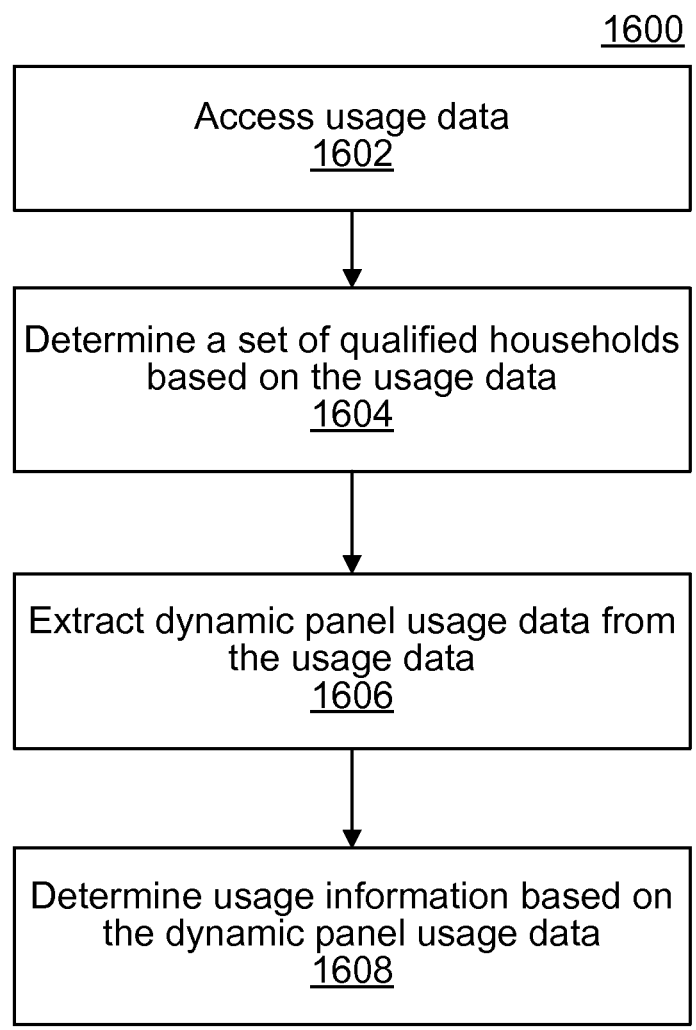
FIG. 16 is a flow chart illustrating an example of a process for determining usage information.

FIG. 16 is a flow chart illustrating an example of a high-level process 1600 for determining usage information, such as usage overlap between different types of devices. Generally, the process 1600 involves determining usage information from the resource accesses of households associated with a specified number and type of client devices. The following describes the process 1600 as being performed by the reporting server 302. However, the process 1600 may be performed by other systems or system configurations.

The reporting server 302 accesses usage data representing network resource accesses by client devices across a plurality of households (1602). The usage data may be beacon data, such as the site-centric data 132b, that includes a beacon cookie, a network address (e.g., IP address), and other information associated with each resource access.

The reporting server 302 determines a set of qualified households based on the accessed usage data (1604). A household can be selected as a qualified household when the usage data indicates that the household is associated with a specified number and type of client devices. A household may also be required to satisfy other requirements to be selected as a qualified household. In some implementations, a qualified household is a single-user household that includes only one personal computer and only one mobile device.

To determine qualified households, the reporting server 302 may first analyze usage data to determine network addresses, such as IP addresses, that are active for (that is, have associated resource accesses), and assigned to a single household for, a defined portion of a time period. For instance, if the time period being analyzed is the previous month, the reporting server 302 may determine network addresses that have been active for and assigned to a single household for at least 3 weeks of the month. These resource accesses associated with these determined network addresses can be considered to represent all of the accesses performed by the users in the corresponding household over the time period.

The reporting server 302 may evaluate resource accesses associated with each of the determined network addresses to determine whether the household represented by the network address should be considered a qualified household. As described further below, beacon cookies and user agent identifiers associated with resource accesses may be evaluated to determine which network addresses represent qualified households.

In some implementations, the reporting server 302 selects the set of qualified households as follows. From of the usage data, the reporting server 302 identifies PC data that represents network accesses by personal computers. From the PC data, the reporting server 302 identifies PC beacon cookies that have been persistent during a predetermined period of time (e.g., a particular month). From the set of persistent PC beacon cookies, the reporting server 302 selects a set of reference cookies by removing beacon cookies associated with multiple IP addresses during the predetermined period. As a result, the set of reference cookies includes persistent PC beacon cookies having traffic over only one IP address during the predetermined period.

The reporting server 302 then selects the IP addresses associated with the reference cookies as reference IP addresses. Of the reference IP addresses, the reporting server 302 selects candidate IP addresses for which each PC beacon cookie having traffic over the candidate IP address during the predetermined period is included in the set of reference cookies. In other words, to select candidate IP addresses, the reporting server determines which reference IP addresses are associated with only persistent PC beacon cookies and selects those determined IP addresses as the candidate IP addresses. For example, the reporting server may count the total number of PC beacon cookies associated with a given reference IP address, count the number of persistent PC beacon cookies associated with the reference IP address, and select the reference IP address as a candidate IP address when these counts are equal.

Consequently, all PC beacon cookies associated with a candidate IP address during the predetermined period are persistent during the predetermined period and have traffic over only one IP address during the predetermined period. By selecting candidate IP addresses in this manner, the recorded network traffic for a PC beacon cookie associated with a candidate IP address completely describes all recorded network traffic for the personal computer where the PC beacon cookie resides. Because the beacon cookie is persistent, the traffic will not be split among multiple cookies on the same IP address. Because the cookie is limited to a single IP address, traffic will not be divided across multiple IP addresses.

From the candidate IP addresses, the reporting server 302 selects qualified IP addresses that are associated with the specified number and type of client devices during the predetermined period. For example, the reporting server 302 selects qualified IP addresses that have traffic from exactly one personal computer and exactly one mobile device during the predetermined period. Each of the qualified IP addresses is an identifier for a qualified household.

The reporting server 302 extracts dynamic panel usage data from the usage data (1606). The dynamic panel usage data corresponds to resource accesses by client devices associated with the set of qualified households. To extract the dynamic panel usage data corresponding to a qualified household, the reporting server may identify the beacon cookies associated with the household, and extract the usage data representing resource accesses associated with those cookies. A beacon cookie may be associated with a household when the cookie is associated with at least one network access from the network address for the household. The reporting server 302 may identify cookies and extract data for each household in the set of qualified households. The dynamic panel usage data describes network accesses for all devices of the qualified households, and for network accesses occurring at home (e.g., through a home network address) and away from home (e.g., through network addresses other than the home network address).

The reporting server 302 determines usage information for the specified number and type of client devices based on the dynamic panel usage data (1608). The specified number and type of client devices is the same specified number and type referred to in action (1604). The usage information may be determined using the techniques described above. For example, the dynamic panel usage data can be used to refine usage measures derived from beacon data, in the same manner that panel-centric data 132a is used. That is, the overlap processor 306 may use the dynamic panel usage as sample data to generate overlap factors, and then use the overlap factors to determine combined unique views, as described above for the process 1500 (see FIG. 15). The dynamic panel usage data may be analyzed to determine the visitation or other habits of the qualified households, which may be extrapolated to the larger population of all Internet users.

In some implementations, a measure indicating usage overlap for client devices of a first type and client devices of second type may be determined based on the dynamic panel usage data that reflects the network accesses of the qualified households. One or more overlap factors may be generated using the process 1500, with the dynamic panel usage data used as sample data. One or more measures of combined unique views of a resource or collection of resources may be determined using the overlap factor. For example, the measure of usage overlap may indicate, for a particular web entity (e.g., a resource or collection of resources), the extent that users visit the web entity with both a client device of a first type and a client device of a second type. Further, an overlap factor may indicate, for a particular web entity, that a certain percentage or fraction of users who access the resource using a personal computer also visit the web entity using a mobile device. When estimating a total number of unique visitors to the web entity based on the usage data, the overlap factor determined using the dynamic panel usage data may then be used to avoid overcounting users that visit the web entity with different types of devices.

Other usage information may also be generated using the dynamic panel usage data. For example, the dynamic panel usage data may be used to determine a measure of overlap between mobile browser resource accesses and mobile application resource accesses. The dynamic panel usage data may be used to determine a measure of overlap in usage among different types of devices, different types of resources, or different types of user agents. The dynamic panel usage data may be used to determine a measure of overlap in usage across different locations, such as usage at home and usage away from home, including usage at work. The dynamic panel usage data may be used to determine a measure of overlap in different types of usage, such as accesses of web page content and video content. In general, overlap may be determined for usage among different platforms, where the platforms may be defined according to device types, user agent types, user locations, or other criteria.

In some implementations, determinations of measures of overlap are facilitated by determining the set of qualified households so that each qualified household is estimated to include only a single user. In such implementations, resource accesses associated with the beacon cookies for a household reflect accesses by that single user. Information about resources accessed by individual users can be used to avoid duplication of user counts when calculating a number of unique views across multiple platforms.

Figure 17:
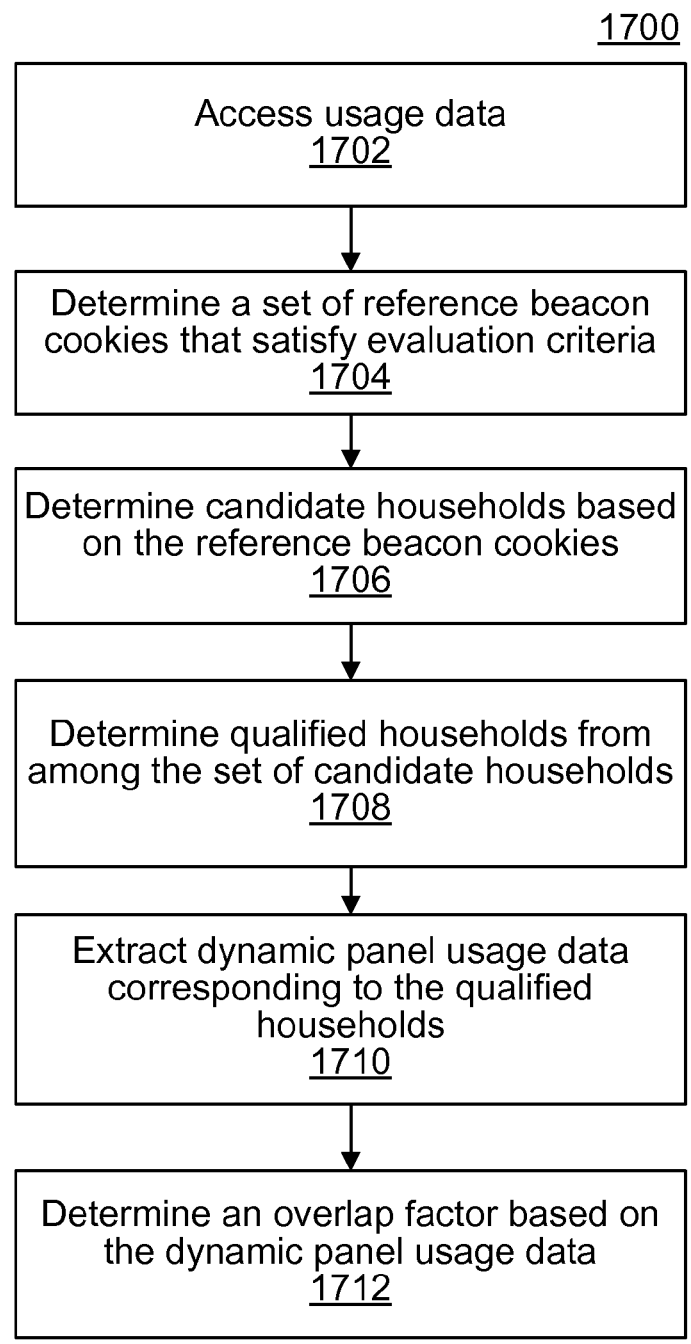
FIG. 17 is a flow chart illustrating an example of a process for determining data indicating usage overlap.

FIG. 17 is a flow chart illustrating an example of a process 1700, which is a particular implementation of the process 1600 for determining usage overlap. For example, the process 1700 may be used to determine a measure of overlap between usage of one type of device and another type of device. As another example, the process 1700 may be used to determine a measure of overlap of usage of a device at home and away from home. The overlap factor may be used to determine a count of unique visitors to a resource or collection of resources. Generally, the process 1700 involves extracting data for households that are associated with a specified number and type of client devices. The following describes the process 1700 as being performed by the reporting server 302. However, the process 1700 may be performed by other systems or system configurations.

The reporting server 302 accesses usage data representing resource accesses on a network (1702). The usage data may be beacon data, such as the site-centric data 132b, that identifies a cookie or other identifier, a network address, and other information associated with each resource access.

Accessing the usage data may include accessing a base set of usage data representing resource accesses having specified characteristics. For example, the base set of usage data can be the data that represents resource accesses by client devices of a particular device type, where at least one resource access by the client device is recorded during a specified time period, and the client device is located in a particular geographic region. In some implementations, the base set of usage data corresponds to resource accesses of personal computers for which at least one resource access is observed during a particular month, and the resource access occurs within a particular country. The base set of usage data can be used to identify qualified households. An example of a process for accessing usage data is described below with respect to FIG. 18.

From the accessed usage data, the reporting server 302 selects reference beacon cookies that satisfy evaluation criteria (1704). The evaluation criteria can include, for instance, the duration of the beacon cookie and the number of unique network addresses associated with the beacon cookie during the predetermined period. Using such criteria, the reporting server may analyze network activity associated with the beacon cookies and select persistent beacon cookies that are associated with a particular number of unique network addresses.

Persistent cookies are those that are active over a defined portion of an analysis period. For example, the analysis period may be a month and persistent cookies may be those for which the usage data indicates that the beacon cookie is associated with a resource access occurring before the beginning of the month and a resource access occurring after a threshold time, such as after the third week of the month. When a cookie is persistent over most of an analysis period, most of the resource accesses corresponding to the persistent cookie are typically represented in the usage data. As an example, if a beacon cookie remains active on a computer for at least the first three weeks of a month, there is a high likelihood that most of the resource accesses of that computer during the month, if not all of them, have occurred in association with the beacon cookie.

As noted, the selected cookies also may be limited to those beacon cookies associated with a particular number of unique network addresses. For example, for a beacon cookie to be selected as a reference beacon cookie, the reporting server 302 may require that all resource accesses that occur during an analysis period and in association with the beacon cookie be associated with a single network address. An example process for selecting beacon cookies is described below with respect to FIG. 19.

The reporting server 302 determines candidate households based on the reference beacon cookies (1706). The candidate households each have traffic associated with one of the reference beacon cookies during the predetermined period. In addition, all beacon cookies of a particular type (e.g., all PC cookies) associated with a candidate household are persistent over the predetermined period.

In order to determine the candidate households, the reporting server 302 identifies the network addresses associated with the reference beacon cookies. The identified network addresses are referred to as reference network addresses, since each has traffic associated with a reference beacon cookie. The reporting server 302 then identifies and evaluates the beacon cookies associated with the reference network addresses.

For each reference network address, the reporting server identifies all cookies of a particular type, such as all PC cookies. If all of the cookies of the particular type (e.g., PC cookies) for the reference network address are persistent over the predetermined period, then the household that corresponds to the reference network address is considered to be a candidate household. The reference network address is used as an identifier for the candidate household.

With the set of candidate households determined in this manner, all of the PC beacon cookies associated with a candidate household will be reference beacon cookies. The reporting server 302 may infer that, during the predetermined analysis period, any PC beacon cookie associated with a candidate household will not have traffic outside the network address that serves as the household identifier for the candidate household. An example of a process for determining a set of candidate households is described below with respect to FIG. 20.

The reporting server 302 determines a set of qualified households, from among the set of candidate households (1708). Each of the qualified households is estimated to have a particular number and type of client devices. The reporting server 302 may estimate the number and type of client devices associated with a household by analyzing the user agent identifiers associated with resource accesses occurring over the network address that identifies the household. Examples of processes for determining numbers of client devices of different types are described below with respect to FIGS. 21 and 22.

Examples of device types include personal computers, mobile devices, tablet devices, and gaming consoles. Device types may be defined according to physical characteristics, software environments, or other factors. For example, a device type may be defined based on one or more of, for example, an operating system, a user agent, a form factor, a screen size, an input or output capability, a hardware capability, a software capability, a processing capability, a networking capability, a manufacturer, or other attribute. Further, the device types may be defined to be mutually exclusive, so that each device may have only one device type. For example, personal computers may be defined to be devices running one of a first set of operating systems or user agents. Mobile devices may be defined to be devices running one of a second set of operating systems or user agents, where the second set does not include any of the operating systems in the first set of operating systems.

In some implementations, the qualified households are determined so that each household is estimated to include a single device of a first type and a single device of a second type. For example, each household can be one for which the usage data indicates resource accesses during the analysis period by a single personal computer and a single mobile device.

The reporting server 302 may estimate the number and type of client devices associated with a candidate household by analyzing user agent identifiers associated with network traffic for the household. A user agent identifier may indicate, for example, a version and type of web browser or other application involved in accessing a resource. Because certain user agents (e.g., web browsers or other applications) are known to correspond to certain device types, the type of device used to access the resource may be inferred from the user agent identifier. For example, when a user agent identifier for a mobile web browser is associated with a resource access, it may be inferred that a client device of the mobile device type was used to perform the resource access. When a user agent identifier for a web browser that runs on personal computers is associated with a resource access, it may be inferred that a client device of the personal computer type was used to perform the resource access.

For each candidate household, the reporting server 302 may estimate a number of devices of each device type. The reporting server 302 may determine the total number for each device type based on the beacon cookies associated with the network address for the household, and the user agent identifiers associated with the cookies. For example, when resource accesses associated with a particular network address and a particular user agent identifier are associated with two different beacon cookies in the usage data, the reporting server 302 may determine that there are likely two client devices of the same type in the household. By contrast, when a single beacon cookie is associated with a particular network address and a particular user agent identifier in the usage data, the reporting server 302 may determine that there is only one client device of that device type in the household. If the usage data indicates that no resource accesses occurred with any user agent corresponding to a particular device type, then the reporting server 302 may determine that there are no devices of that device type. For example, when there are no resource accesses over a network address using any mobile web browsers, the reporting server 302 determines that there are no mobile devices in the household.

As described further with respect to FIGS. 21 and 22 below, the reporting server 302 may use additional data to refine the numbers of devices counted for each device type. For example, in addition to evaluating the counts of unique beacon cookies per user agent, the reporting server 302 may evaluate the numbers of operating system identifiers or application identifiers to estimate device counts.

In some implementations, only households that are estimated to have a particular number of users are selected as qualified households. The number of users in a household may be estimated based on network traffic patterns or the number and type of client devices associated with the household. For example, a household that accesses resources with a single personal computer and a single mobile device may be considered to be a household that includes only a single user. In some implementations, determining a set of households each estimated to have only a single user facilitates the determination of measures of usage overlap among different devices, different device types, different locations, etc.

The reporting server 302 extracts dynamic panel usage data corresponding to the qualified households (1710). Although the base set of data used to identify qualified households may represent only network traffic from personal computers, the dynamic panel usage data includes data for personal computers as well as other types of devices, such as mobile devices. An example of extracting dynamic panel usage data is described below with respect to FIG. 23.

To extract the dynamic panel usage data, the reporting server 302 extracts usage data representing resource accesses associated with each network address corresponding to a qualified household. For example, the reporting server 302 extracts data representing all resource accesses over all of the network addresses that serve as household identifiers for the qualified households. Because the network address that serves as the household identifier is typically a home network address, this data may be designated as in-home data, or data representing resource accesses by users in qualified households while at home.

The reporting server 302 may also extract usage data for resource accesses that represent usage away from a user's home. The out-of-home usage data is also included in the dynamic panel usage data. To obtain out-of-home data, the reporting server 302 identifies beacon cookies associated with the in-home data. The reporting server 302 then extracts out-of-home usage data as data indicating resource accesses that are associated with these beacon cookies, but that occur through network addresses other than the network address that identifies the qualified household.

Because cookies typically have unique values for each user agent and not simply for each device, the number of beacon cookies for a qualified household may be greater than the number of devices in the qualified household. For example, for a household where the usage data indicates a single personal computer and a single mobile device, the beacon cookies for the household may include a cookie for each web browser on the personal computer, a beacon cookie for a web browser on the mobile device, and beacon cookies for each of several applications on the mobile device. The dynamic panel usage data indicates resource accesses associated with all of the beacon cookies associated with the qualified households.

Extracting dynamic panel usage data in this manner can provide information about how a device is used at home and away from home. As an example, a network address corresponding to a household may be a static IP address of a home Internet service. When a user uses a mobile device using a network connection associated with the home (e.g., a home WiFi connection), resource accesses from the mobile device are typically associated with the static IP address associated with the household. These resource accesses may be identified as occurring at the user's home because they are associated with the home network address. However, when the mobile device accesses resources through other network connections, such as a cellular connection or a WiFi connection at work, the mobile device's beacon cookies will be associated with resource accesses through those other network addresses and not the home network address. Accordingly, these other resource accesses may be identified as occurring away from the user's home. The dynamic panel data includes data associated with the mobile device's beacon cookies across multiple network addresses, and thus indicates resource accesses by the mobile device at home and away from home.

The reporting server 302 determines data representing usage overlap of multiple types of devices based on the dynamic panel usage data (1712). The dynamic panel usage data represents resource accesses from households that have certain commonalities, for example, the same number and type of client devices. From the dynamic panel usage data, the reporting server 302 may determine a number, percentage, or other measure of households that access a resource, or one of a set of resources, with different types of client devices. The data representing usage overlap among different types of devices may then be extrapolated to a larger set of data to refine counts of unique viewers of a resource or set of resources.

Figure 18:
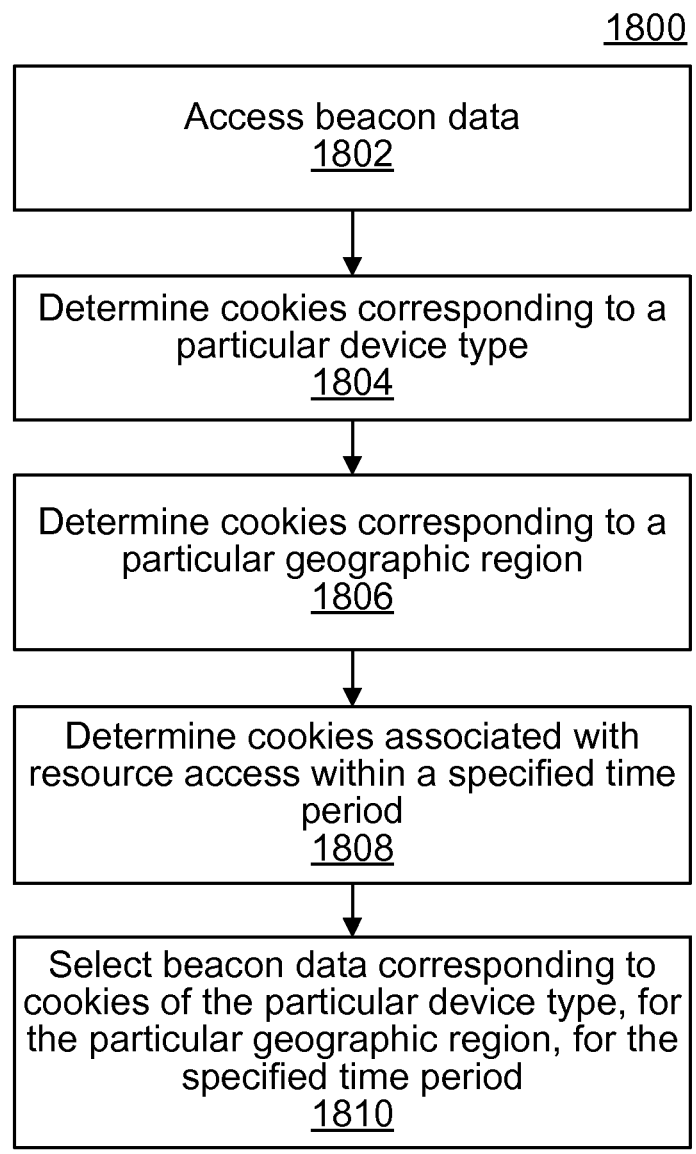
FIG. 18 is a flow chart illustrating an example of a process for accessing usage data.

FIG. 18 is a flow chart illustrating an example of a process 1800 for accessing usage data. Generally, process 1800 involves accessing data representing network activity having desired characteristics. For example, the process 1800 may select a dataset indicating resource accesses performed by devices of a specified type, from within a specified geographical area, and/or during a specified time period from among broader collection of data. The following describes the process 1800 as being performed by the reporting server 302. However, the process 1800 may be performed by other systems or system configurations. The process 1800 may be performed as part of accessing usage data (1702) in the process 1700.

The reporting server 302 accesses beacon data (1802). The beacon data may include data representing accesses to a particular resource or one of a set of multiple resources, by devices of multiple types in multiple geographic regions, where the accesses occur over a range of time.

The reporting server 302 determines that a set of cookies corresponds to a particular device type (1804). For example, the beacon data can indicate, for each resource access indicated in the beacon data, an identifier for a cookie and a corresponding user agent identifier. From the user agent identifier, the reporting server 302 may determine the device type, user agent (e.g., web browser), operating system, and/or other information about the client device that performed the resource access recorded in the beacon data. To determine this information from the user agent identifier, the reporting server 302 may access a dictionary or table that maps user agent identifiers to corresponding user agents, operating systems, device types, and other client device properties.

The reporting server 302 examines the user agent identifiers and selects cookies associated with user agent identifiers indicating a particular device type. For example, the reporting server may determine a set of cookies identified in the beacon data, where each cookie corresponds to a user agent for a personal computer. The set of cookies from personal computers is referred to as "PC cookies."

The reporting server 302 determines that a set of cookies corresponds to a particular geographical area (1806). For example, the reporting server 302 may determine a set of cookies having resource accesses occurring in a particular continent, country, state, county, city, or other geographic region, or in any of a set of multiple geographic regions. In some implementations, the reporting server examines a network address, an identifier for a cookie, a user agent identifier, or other value associated with a beacon hit to determine the geographic region corresponding to a resource access. A cookie that is associated with one or more recorded resource accesses from a geographic region may be considered to correspond to that geographic region. In some implementations, a cookie corresponds to a geographic region only when all recorded resource accesses associated with the cookie occur from the geographic region. The set of cookies may be selected from among the cookies corresponding to a particular device type. For example, a set of PC cookies corresponding to a particular country may be selected.

The reporting server 302 determines that a set of cookies is associated with at least one resource access during a specified time period (1808). For example, the reporting server 302 determines a set of cookies where each cookie has at least one beacon hit within a defined time period. In some implementations, the time period is a month, and selected cookies must have at least one beacon hit during the month. In some implementations, the set of cookies is selected from among the cookies corresponding to a particular geographical region and device type, for example, from among the PC cookies corresponding to a particular country.

The reporting server 302 selects beacon data corresponding to cookies that (i) are associated with a device of the particular device type, (ii) correspond to the particular geographic region, and (iii) have at least one beacon hit recorded during the specified time period (1810). This set of data may be a base set of usage data with which the reporting server 302 may then perform further processing.

Figure 19:
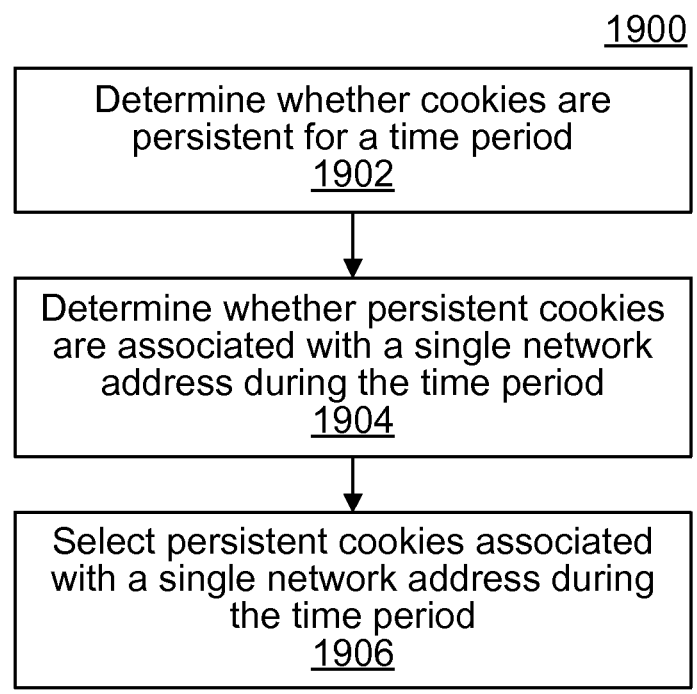
FIG. 19 is a flow chart illustrating an example of a process for determining a set of identifiers.

FIG. 19 is a flow chart illustrating an example of a process 1900 for determining a set of reference beacon cookies that satisfy evaluation criteria. Generally, process 1900 involves determining beacon cookies or other identifiers that satisfy one or more criteria. The following describes the process 1900 as being performed by the reporting server 302. However, the process 1900 may be performed by other systems or system configurations. The process 1900 may be performed as part of determining a set of identifiers (1704) in the process 1700.

The reporting server 302 determines whether one or more cookies are persistent for a time period (1902). The reporting server may use the base set of data from the process 1800, which includes identifiers for cookies associated with a particular device type, a particular geographic region, and accesses within a specified time period. The reporting server 302 determines which of these cookies satisfies a persistence threshold. For example, the reporting server 302 determines which cookies have remained on a client device for at least a minimum duration during the specified time period.

In some implementations, the reporting server 302 determines a set of cookies that remain active on a client device for most of a specified time period. For example, where the time period is a month, the persistent cookies can be those that are associated with beacon hits that span most of the month.

In some implementations, the date when a cookie is first established on a client device is recorded. Persistent cookies may be defined as those for which the date when a cookie is established is before the beginning of the time period, and at least one beacon hit is recorded during an end portion of the time period. Cookies that satisfy these criteria may be considered to be active over the span of the time period. For example, when the time period is a month, the reporting server 302 determines whether cookies were established before the first day of the month, and are also associated with at least one beacon hit during the last seven days of the month. These persistent cookies may be considered to be active over the entire month.

The reporting server 302 determines whether persistent cookies are associated with a single network address during the time period (1904). For example, for a time period of a month, the reporting server determines which of the persistent cookies are associated with resource accesses over exactly one IP address during the month. If a cookie is associated with multiple network addresses during a month, for example, due to a power outage and subsequent reset of a home network address, or due to a laptop computer using networking connections at multiple locations, the cookie is not selected for further processing.

When a persistent cookie is associated with a single network address during the time period, the network address is likely to have been assigned to the same household over the entire time period. In addition, when a persistent cookie is associated with only one network address, records of network traffic over the network address may indicate all recorded resource accesses associated with the cookie. Persistent, single-network-address cookies are likely to correspond to stationary client devices, such as personal computers at a user's home, rather than a laptop computer whose resource accesses may be spread over multiple network addresses.

As an example, a beacon cookie is persistent on a personal computer during the month of August, and that the cookie corresponds to the Chrome web browser. In this case, network page views associated with that cookie represent all page views of resources tracked with beacons for the personal computer's Chrome traffic for the month of August. Additionally, if all of the page views originated from one specific IP address, it is known that this personal computer only accessed online content tracked by beacons via the Chrome browser from one location during the month. Therefore, the traffic for this personal computer for the Chrome browser is a subset of the traffic from the IP address, and no traffic for the Chrome browser for this personal computer will occur on any other IP address during August.

The reporting server 302 selects persistent cookies that are associated with only one network address during the time period (1906). Cookies that are not persistent over the time period and cookies that have beacon hits associated with more than one IP address during the period are excluded from the set. The selected cookies are the reference beacon cookies referred to above.

In some implementations, the reporting server 302 performs other processing to determine a set of reference beacon cookies. For example, cookies associated with invalid or inconsistent data may be excluded. If a cookie is associated with more than one operating system, or the cookie is associated with more than one user agent, the data for that cookie may be considered to be unreliable. Such cookies and their associated data are excluded from further processing.

Figure 20:
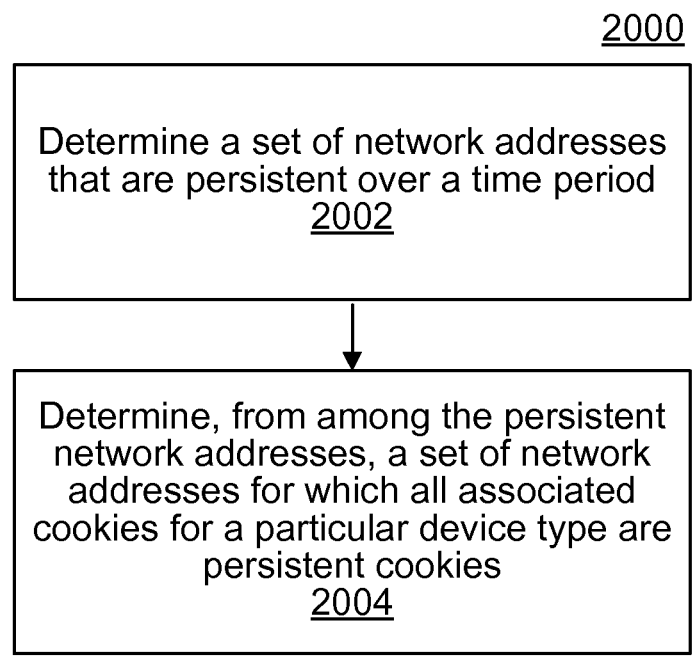
FIG. 20 is a flow chart illustrating an example of a process for determining a set of households.

FIG. 20 is a flow chart illustrating an example of a process 2000 for identifying candidate households. Generally, process 2000 involves identifying network addresses that represent households with desired characteristics. The following describes process 2000 as being performed by the reporting server 302. However, the process 2000 may be performed by other systems or system configurations. The process 2000 may be performed as part of determining a set of households (1706) in the process 1700.

The reporting server 302 determines network addresses that are persistent over a time period (2002). The reporting server 302 may determine persistent network addresses based on a set of persistent cookies that are each associated with a single network address during the time period. The set of cookies may be the set selected by the process 1900, described above. With the set of persistent cookies associated with a single network address, the reporting server 302 determines the network address associated with each cookie in the set. The network addresses associated with these cookies represent network addresses that were active and assigned to a single household over the entire time period.

The reporting server 302 determines a set of candidate network addresses (2004). The set of candidate network addresses can be a subset of the persistent network addresses for which all associated cookies of a particular device type are persistent cookies. Each candidate network address represents a candidate household.

When all cookies associated with a network address are persistent, and each of the cookies is associated with only a single network address, it is likely that the activity over the network address includes all activity of the client device associated with the cookies. For example, for a candidate network address selected in this manner, and using a specified time period of a month, it may be inferred that the candidate network address is assigned to a single household for the entire month, and every client device of a particular type (e.g., personal computer) using the network address uses only that network address during the month.

In some implementations, if a client device has a web browser that clears a cookie during the time period, resulting in a cookie that is not persistent over the time period, the network address associated with the cookie is excluded from the set of candidate network addresses. When a cookie is not persistent, the resource accesses associated with the cookie may not fully describe the activity of the corresponding user agent. Further, when a new cookie is established, ambiguity may arise as to whether activity on the network address reflects resource accesses by multiple client devices running the same user agent, or a single client device having a user agent with multiple cookies.

For each of the persistent network addresses, the reporting server 302 may determine a first count of the total number of cookies associated with the network address in the base data (e.g., the base data determined by the process 1800). The reporting server 302 may also determine a second count of the number of persistent cookies associated with the network address and not associated with any other network address during the specified time period. The reporting server 302 may determine the second count by counting the number of cookies associated with the network address that are included in the set determined by the process 1900. As described above, both of these cookie counts reflect cookies for devices of a single type, for example, client devices that are personal computers.

The reporting server 302 may determine that a network address is a candidate network address by comparing the first count for the network address with the second count for the network address. If the first count equals the second count, the network address is determined to be a candidate network addresses. If the counts are different, indicating that one or more cookies associated with the specified device type are not persistent, the network address is not considered a candidate network address.

In some implementations, the reporting server 302 also evaluates the usage data for a household to determine the number of cookies associated with each accessed resource (e.g., example.com). Candidate network addresses may be determined such that usage data indicates a single cookie per accessed resource during the specified time period. These households may be estimated to have a single user in the household. If multiple accesses to a particular resource occur over a network address, and more than one cookie is associated with the accesses, the network address may be considered to represent a household with multiple users, and may be excluded from the set of candidate households.

Each of the candidate network addresses can represent a candidate household having resource access patterns suitable for further processing. For example, due to the criteria for selecting the candidate network addresses, it can be inferred that any cookie associated with the specified device type having at least one beacon hit on the network address will not have any beacon hits for any other network address during the time period. For example, when an IP address is determined to be a candidate network address based on personal computer network traffic, any PC cookie having a beacon hit on the IP address during the specified time period will not have any beacon hits on any other IP address during the specified time period.

Figure 21:
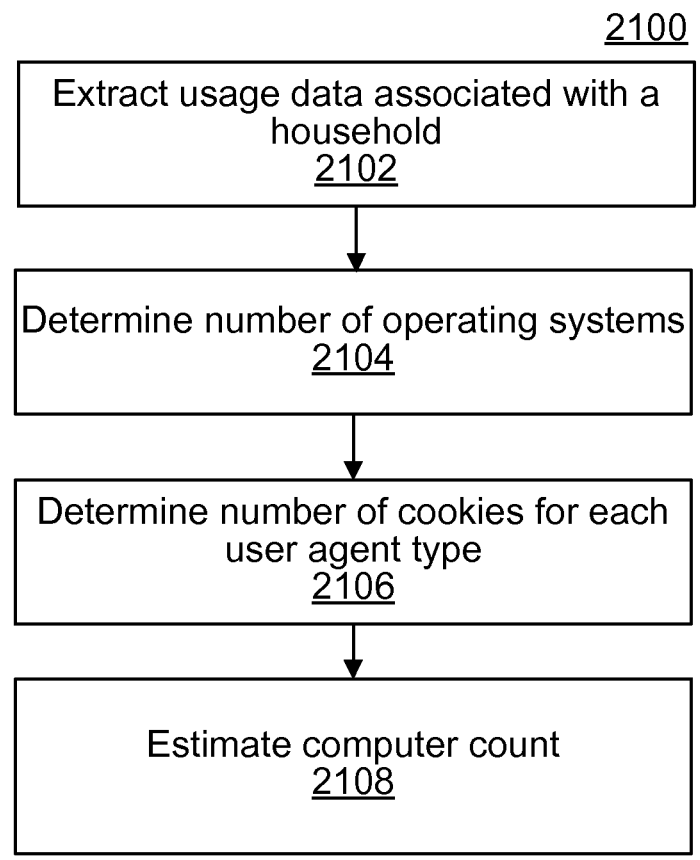
FIG. 21 is a flow chart illustrating an example of a process for estimating a number of personal computers in a household.

FIG. 21 is a flow chart illustrating an example of a process 2100 for estimating a number of personal computers in a household. Generally, process 2100 involves evaluating user agent identifiers associated with a network address to estimate a number of personal computers associated with the household represented by the network address. The following describes the process 2100 as being performed by the reporting server 302. However, the process 2100 may be performed by other systems or system configurations. The process 2100 may be performed as part of determining households that appear to be associated with a specified number and type of client devices (1708) in the process 1700.

The reporting server 302 extracts usage data corresponding to a household (2102). The household may have a corresponding network address, which is selected from the set of candidate addresses determined by the process 2000. Data representing resource accesses over the network address (e.g., data indicating beacon hits for the network address) is extracted.

The reporting server 302 determines a number of operating systems associated with the network address for the household (2104). For example, from the extracted data for the network address, the reporting server 302 identifies the user agent identifiers associated with resource accesses during the specified time period for analysis. The reporting server 302 then examines the user agent identifiers to determine a number of unique personal computer operating systems or personal computer operating system versions that correspond to the various user agent identifiers.

The reporting server 302 determines a number of cookies for each of user agent type (2106). The reporting server 302 examines the user agent identifiers and determines, for each user agent type (e.g., for each class or category of web browser, such as Chrome, Firefox, Safari, etc.), how many unique cookies are associated with resource accesses by user agents of that type. For example, a first count of the different cookies identified for a first user agent type is determined, a second count of the different cookies associated with a second user agent type is determined, and so on.

The reporting server 302 evaluates a number of cookies per browser type rather than per browser, because a particular browser may appear as different user agents. If, for example, a user installs a toolbar in Chrome in the middle of the month, the usage data may suggest that there are two different user agents or instances for the Chrome browser during that month. Given the number of variations in user agent identifiers that a browser can have, the reporting server counts the number of browser categories (e.g., Internet Explorer, Firefox, Chrome, Opera, etc.) represented in the usage data, rather than counting the number of unique user agent identifiers.

The reporting server 302 estimates a personal computer count for the household (2108). The personal computer count is estimated based on the number of operating systems associated with resource accesses associated with the household and the number of cookies associated with each user agent type.

As an example, a household may be estimated to have one personal computer when the determined number of operating systems is one, and the determined number of cookies for each user agent type is no more than one. As another example, a household may be estimated to have two personal computers when: (i) the determined number of operating systems is one, and the determined number of cookies for each user agent type is no more than two; or (ii) the determined number of operating systems is two, and the determined number of cookies for each user agent type is no more than one. All other households that correspond to candidate network addresses and are not estimated to have one or two personal computers may be estimated to have three or more personal computers. Because the set of candidate households is determined based on resource accesses by personal computers, none of the candidate households have zero personal computers. The number of personal computers in a household corresponding to a candidate network address may be estimated as follows:

| ESTIMATED NUMBER OF PERSONAL COMPUTERS | CRITERIA |
| --- | --- |
| 1 | 1 operating system AND no more than 1 cookie per user agent type |
| 2 | 1 operating system AND no more than 2 cookies per user agent type OR 2 operating systems AND no more than 1 cookie per user agent type |
| 3 or more | Any candidate network address not estimated to have one or two personal computers |

Figure 22:
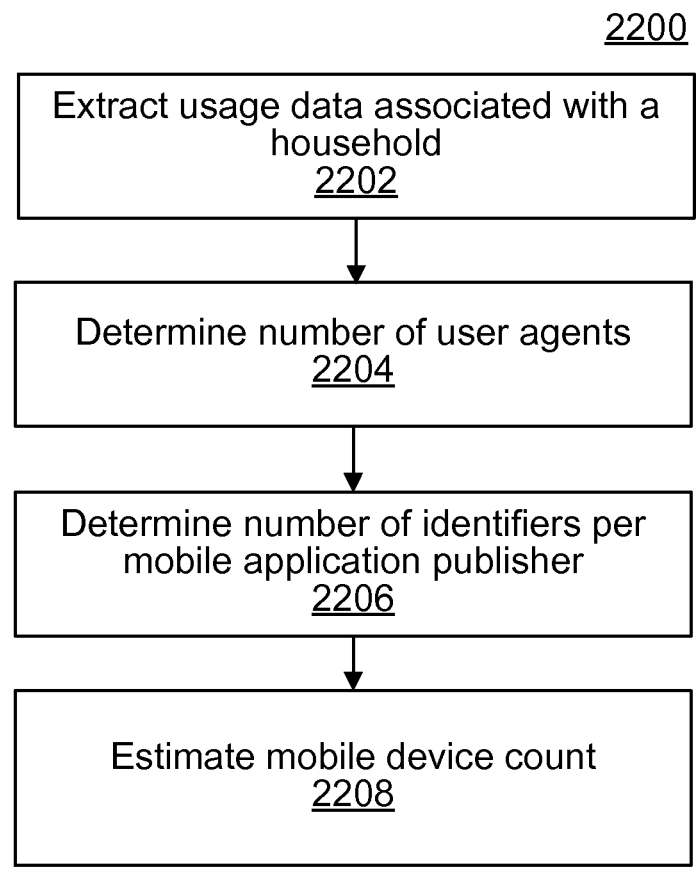
FIG. 22 is a flow chart illustrating an example of a process for estimating a number of mobile devices in a household.

FIG. 22 is a flow chart illustrating an example of a process 2200 for estimating a number of mobile devices in a household. Generally, process 2200 involves evaluating user agent identifiers and other identifiers associated with a network address to estimate a number of mobile devices associated with the household represented by the network address. The following describes process 2200 as being performed by the reporting server 302. However, the process 2200 may be performed by other systems or system configurations. The process 2200 may be performed as part of determining households that appear to be associated with a specified number and type of client devices (1708) in the process 1700.

The reporting server 302 extracts usage data corresponding to a household (2202). The household may have a corresponding network address, which is selected from the set of candidate addresses determined by the process 2000. Data representing resource accesses over the network address (e.g., data indicating beacon hits for the network address) is extracted.

The reporting server 302 determines a number of user agents associated with the network address for the household (2204). For example, from the extracted data for the network address, the reporting server 302 identifies the user agent identifiers associated with resource accesses during the specified time period for analysis. The reporting server 302 then examines the user agent identifiers to determine a number of unique mobile user agents (e.g., mobile web browsers) identified correspond to the various user agent identifiers.

The reporting server 302 determines a number of identifiers for each mobile application publisher (2206). In some implementations, each installation of a mobile application has a unique identifier designated by the publisher. For example, the identifier may be a hash value generated based on a value determined by the publisher and a media access control (MAC) address of the mobile device on which the application is installed. Mobile device applications may invoke resource access events through user agent functionality embedded within the mobile application. When resource accesses occur through these embedded functions, the unique identifier (e.g., hash value) for the mobile application installation may be provided in connection with a beacon hit, as well as an identifier for the mobile application or publisher of the mobile application. The reporting server 302 may analyze the extracted data for the network address to determine a number of different identifiers that are associated with different mobile application publishers. For example, a first count of unique hashes for mobile applications from a first publisher may be determined, a second count of unique hashes for mobile applications from a second publisher may be determined, and so on.

The reporting server 302 estimates a mobile device count for the household (2108). The mobile device count is estimated based on the number of different mobile user agents associated with resource accesses associated with the household and the number of unique identifiers (e.g., hash values) associated with each mobile application publisher.

As an example, when data indicating resource accesses over the network address do not indicate any accesses associated with mobile user agents or mobile applications, the household may be estimated to have zero mobile devices. A household may be estimated to have one mobile device when the determined number of user agents is one, and the determined number of unique identifiers (e.g., hash values) for each mobile application publisher is no more than one. A household may be estimated to have two mobile devices when: (i) the determined number of user agents across all mobile traffic over the network address is two, or (ii) for at least one mobile application publisher, there are two corresponding unique identifiers (e.g., hash values). A household may be estimated to have three or more mobile devices if the determined number of mobile user agents is three or more, or if, for at least one mobile application publisher, there are three or more corresponding unique identifiers (e.g., hash values). The number of mobile devices in a household corresponding to a candidate network address may be estimated as follows:

| ESTIMATED NUMBER OF MOBILE DEVICES | CRITERIA |
| --- | --- |
| 0 | No mobile user agent traffic with cookies, and no mobile application traffic |
| 1 | No more than 1 mobile user agent AND No more than 1 hash value per mobile application publisher |
| 2 | 2 mobile user agents OR 2 hash values per mobile application publisher for one or more mobile applications |
| 3 or more | More than 2 user agents OR More than 2 hash values per mobile application publisher for one or more mobile applications |

Figure 23:
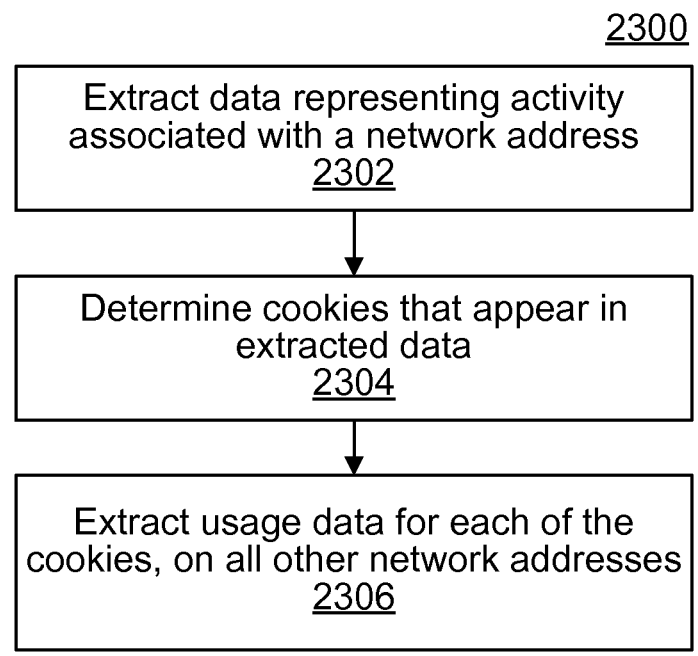
FIG. 23 is a flow chart illustrating an example of a process for selecting a subset of usage data corresponding to a household.

FIG. 23 is a flow chart illustrating an example of a process 2300 for selecting a subset of usage data corresponding to a household. Generally, process 2300 involves extracting usage data representing resource accesses of a household, at home and away from home. The following describes the process 2300 as being performed by the reporting server 302. However, the process 2300 may be performed by other systems or system configurations. The process 2300 may be performed as part of selecting dynamic panel usage data (1710) for qualified households in the process 1700.

The process 2300 indicates data extracted for a single household, based on its corresponding network address. The process 2300 may be performed for each of a set of households to obtain data representing the resource accesses of each of the households. Collectively, the extracted usage data for the qualified households is the dynamic panel usage data.

The reporting server 302 extracts data representing activity associated with a network address (2302). For example, the reporting server 302 extracts, from a set of beacon data, data that represents each network access that occurs over the network address and that occurs during a specified time period. The network address may represent the home network address for the corresponding household, so extracted data associated with the network address may be designated as in-home data.

The reporting server 302 determines cookies that appear in the extracted data (2304). For example, the reporting server 302 may determine a set of cookies that are each associated with at least one network access described by the in-home data. Unique identifiers corresponding to mobile application publisher (e.g., hash values) may be considered to be cookies, and may be extracted and included in the determined set of cookies.

The reporting server 302 extracts usage data for each of the cookies determined to appear in the extracted data (2306). For example, for each of the identifiers in a set of identifiers (e.g., cookies or mobile application hash values), data indicating resource accesses associated with the identifiers on all other network addresses other than the home network address may be extracted. This data may be designated as out-of-home data. Together, the in-home data and out-of-home data may represent all resource accesses that a set of beacon data records for the household over the duration of a specified time period, by all devices in the household.

Systems for Implementation

The techniques described herein can be implemented in digital electronic circuitry, or in computer hardware, firmware, software, or in combinations of them. The techniques can be implemented as a computer program product, i.e., a computer program tangibly embodied in an information carrier, e.g., in a machine-readable storage device, in machine-readable storage medium, in a computer-readable storage device or, in computer-readable storage medium for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the techniques can be performed by one or more programmable processors executing a computer program to perform functions of the techniques by operating on input data and generating output. Method steps can also be performed by, and apparatus of the techniques can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, such as, magnetic, magneto-optical disks, or optical disks. Information carriers suitable for embodying computer program instructions and data include all forms of non-volatile memory, including by way of example semiconductor memory devices, such as, EPROM, EEPROM, and flash memory devices; magnetic disks, such as, internal hard disks or removable disks; magneto-optical disks; and CD-ROM and DVD-ROM disks. The processor and the memory can be supplemented by, or incorporated in special purpose logic circuitry.

A number of implementations of the techniques have been described. Nevertheless, it will be understood that various modifications may be made. For example, useful results still could be achieved if steps of the disclosed techniques were performed in a different order and/or if components in the disclosed systems were combined in a different manner and/or replaced or supplemented by other components.

The invention claimed is:

1. A computer-implemented method, comprising:

accessing, by a reporting server, site-centric usage data representing resource accesses on a network by client devices in a plurality of households, wherein the site-centric usage data results from beacon instructions executed by content-presenting applications on the client devices from which the resource accesses originate, wherein the beacon instructions are configured to cause an executing client device to send a message to a collection server, and wherein the content-presenting applications on the client devices that execute the beacon instructions are otherwise unaffiliated with the collection server;

based on the accessed site-centric usage data, determining, by the reporting server, candidate households that the site-centric usage data indicates are associated with resource accesses from one or more persistent IP addresses, wherein an IP address is a persistent IP address when the IP address has been assigned to and associated with resources accesses from only one of the households in the set of households for at least a threshold period of time;

based on the accessed site-centric usage data, determining, by the reporting server, a set of the candidate households that the site-centric usage data indicates are at least associated with a first specified number of a first type of client device and a second specified number of a second type of client device;

extracting, by the reporting server, a subset of the site-centric usage data, the subset corresponding to resource accesses by client devices associated with the set of candidate households; and based on the extracted subset of the site-centric usage data, determining, by the reporting server, a measure of overlap that estimates an amount of users that have accessed the same resource using a first type of client device and a second type of client device.

2. The computer-implemented method of claim 1 wherein the site-centric usage data indicates that the set of households is associated with exactly one client device of a first client device type and exactly one client device of a second client device type.

3. The computer-implemented method of claim 2 wherein the first client device type is a personal computer type and the second client device type is a mobile device type.

4. The computer-implemented method of claim 1, wherein:
   determining, based on the accessed site-centric usage data, the set of the candidate households that the usage data indicates are at least associated with a first specified number of a first type of client device and a second specified number of a second type of client device comprises:
      determining a base set of beacon cookies that correspond to resource accesses by devices of a particular type;
      determining a base set of usage data comprising data indicating resource accesses associated with the determined base set of beacon cookies; and
      determining, based on the base set of usage data, a set of reference beacon cookies that are persistent for at least a majority of a first time period and are associated with resource accesses from a single network address during the first time period.

5. The computer-implemented method of claim 4, wherein determining the base set of beacon cookies comprises determining a base set of beacon cookies for which each of the beacon cookies in the set is associated with one or more resource accesses by a personal computer located in a particular geographic region within the defined period of time.

6. The computer-implemented method of claim 4, wherein determining the set of the candidate households comprises:
   determining a set of reference network addresses by selecting one or more network addresses associated with the set of reference beacon cookies; and
   determining a set of candidate network addresses by selecting, from the reference network addresses, network addresses for which all associated cookies are persistent during a majority of the first time period.

7. The computer-implemented method of claim 6, wherein determining, based on the accessed site-centric usage data, the set of the candidate households that the site-centric usage data indicates are at least associated with a first specified number of a first type of client device and a second specified number of a second type of client device comprises selecting network addresses, from among the set of candidate network addresses, that the site-centric usage data indicates are associated with exactly one personal computer and exactly one mobile device during the first time period.

8. The computer-implemented method of claim 6, wherein determining the set of the candidate households comprises:
   determining, for each of the candidate network addresses, a number of client devices of a first type that are associated with the candidate network address; and
   determining, for each of the candidate network addresses, a number of client devices of a second type that are associated with the candidate network address.

9. The computer-implemented method of claim 8, wherein the first type is personal computers and determining the number of client devices of the first type that are associated with the candidate network address comprises:
   determining a portion of the site-centric usage data that represents resource accesses associated with the candidate network address;
   determining a number of operating systems for devices of the first type that are indicated by the portion of the site-centric usage data;
   determining, for each of one or more user agent types for devices of the first type, a number of different cookies associated with the user agent type in the determined portion of the site-centric usage data; and
   estimating a number of personal computers associated with the candidate network address based on the number of operating systems and the numbers of different cookies associated with the respective one or more user agent types.

10. The computer-implemented method of claim 8, wherein the first type is mobile devices and determining the number of client devices of the first type that are associated with the candidate network address comprises:
    determining a portion of the site-centric usage data that represents resource accesses associated with the candidate network address;
    determining a number of user agents for devices of the first type that are indicated by the portion of the site-centric usage data;
    determining, for each of one or more mobile application publishers, a number of different identifier values associated with the mobile application publisher in the portion of the site-centric usage data; and
    estimating a number of mobile devices associated with the network address based on the number of user agents and the numbers of different identifier values associated with the respective mobile application publishers.

11. The computer-implemented method of claim 1, wherein extracting the subset of the site-centric usage data comprises, for each of one or more candidate households in the set of candidate households:
    extracting, from the site-centric usage data, in-home data for the candidate household indicating resource accesses associated with a home network address corresponding to the household;
    determining a set of household cookies that are associated with the in-home data; and
    extracting, from the site-centric usage data, out-of-home data for the candidate household indicating resource accesses that are (i) associated with one of the household cookies and (ii) associated with a network address different from the home network address.

12. A non-transitory computer-readable storage medium storing instructions that, when executed by one or more processing devices, cause the one or more processing devices to perform operations comprising:
    accessing, by a reporting server, site-centric usage data representing resource accesses on a network by client devices in a plurality of households, wherein the site-centric usage data results from beacon instructions executed by content-presenting applications on the client devices from which the resource accesses originate, wherein the beacon instructions are configured to cause an executing client device to send a message to a collection server, and wherein the content-presenting applications on the client devices that execute the beacon instructions are otherwise unaffiliated with the collection server;

based on the accessed site-centric usage data, determining, by the reporting server, candidate households that the site-centric usage data indicates are associated with resource accesses from one or more persistent IP addresses, wherein an IP address is a persistent IP address when the IP address has been assigned to and associated with resources accesses from only one of the households in the set of households for at least a threshold period of time;

based on the accessed site-centric usage data, determining, by the reporting server, a set of the candidate households that the site-centric usage data indicates are at least associated with a first specified number of a first type of client device and a second specified number of a second type of client device;

extracting, by the reporting server, a subset of the site-centric usage data, the subset corresponding to resource accesses by client devices associated with the set of candidate households; and based on the extracted subset of the site-centric usage data, determining, by the reporting server, a measure of overlap that estimates an amount of users that have accessed the same resource using a first type of client device and a second type of client device.

13. The non-transitory computer-readable storage medium of claim 12 wherein the site-centric usage data indicates that the set of households is associated with exactly one client device of a first client device type and exactly one client device of a second client device type.

14. The non-transitory computer-readable storage medium of claim 13 wherein the first client device type is a personal computer type and the second client device type is a mobile device type.

15. The non-transitory computer-readable storage medium of claim 12, wherein:
determining, based on the accessed site-centric usage data, the set of the candidate households that the usage data indicates are at least associated with a first specified number of a first type of client device and a second specified number of a second type of client device comprises:
determining a base set of beacon cookies that correspond to resource accesses by devices of a particular type;
determining a base set of usage data comprising data indicating resource accesses associated with the determined base set of beacon cookies; and
determining, based on the base set of usage data, a set of reference beacon cookies that are persistent for at least a majority of a first time period and are associated with resource accesses from a single network address during the first time period.

16. The non-transitory computer-readable storage medium of claim 15, wherein determining the base set of beacon cookies comprises determining a base set of beacon cookies for which each of the beacon cookies in the set is associated with one or more resource accesses by a personal computer located in a particular geographic region within the defined period of time.

17. The non-transitory computer-readable storage medium of claim 15, wherein determining the set of the candidate households comprises:

determining a set of reference network addresses by selecting one or more network addresses associated with the set of reference beacon cookies; and determining a set of candidate network addresses by selecting, from the reference network addresses, network addresses for which all associated cookies are persistent during a majority of the first time period.

18. The non-transitory computer-readable storage medium of claim 17, wherein determining, based on the accessed site-centric usage data, the set of the candidate households that the site-centric usage data indicates are at least associated with a first specified number of a first type of client device and a second specified number of a second type of client device comprises selecting network addresses, from among the set of candidate network addresses, that the site-centric usage data indicates are associated with exactly one personal computer and exactly one mobile device during the first time period.

19. The non-transitory computer-readable storage medium of claim 17, wherein determining the set of the candidate households comprises:
determining, for each of the candidate network addresses, a number of client devices of a first type that are associated with the candidate network address; and
determining, for each of the candidate network addresses, a number of client devices of a second type that are associated with the candidate network address.

20. The non-transitory computer-readable storage medium of claim 19, wherein the first type is personal computers and determining the number of client devices of the first type that are associated with the candidate network address comprises:
determining a portion of the site-centric usage data that represents resource accesses associated with the candidate network address;
determining a number of operating systems for devices of the first type that are indicated by the portion of the site-centric usage data;
determining, for each of one or more user agent types for devices of the first type, a number of different cookies associated with the user agent type in the determined portion of the site-centric usage data; and
estimating a number of personal computers associated with the candidate network address based on the number of operating systems and the numbers of different cookies associated with the respective one or more user agent types.

21. The non-transitory computer-readable storage medium of claim 19, wherein the first type is mobile devices and determining the number of client devices of the first type that are associated with the candidate network address comprises:
determining a portion of the site-centric usage data that represents resource accesses associated with the candidate network address;
determining a number of user agents for devices of the first type that are indicated by the portion of the site-centric usage data;
determining, for each of one or more mobile application publishers, a number of different identifier values associated with the mobile application publisher in the portion of the site-centric usage data; and
estimating a number of mobile devices associated with the network address based on the number of user agents and the numbers of different identifier values associated with the respective mobile application publishers.

22. The non-transitory computer-readable storage medium of claim 12, wherein extracting the subset of the site-centric usage data comprises, for each of one or more candidate households in the set of candidate households:
- extracting, from the site-centric usage data, in-home data for the candidate household indicating resource accesses associated with a home network address corresponding to the household;
- determining a set of household cookies that are associated with the in-home data; and
- extracting, from the site-centric usage data, out-of-home data for the candidate household indicating resource accesses that are (i) associated with one of the household cookies and (ii) associated with a network address different from the home network address.

* * * * *